(12) United States Patent
Okulov

(10) Patent No.: US 7,178,502 B2
(45) Date of Patent: Feb. 20, 2007

(54) BALANCED ROTARY INTERNAL COMBUSTION ENGINE OR CYCLING VOLUME MACHINE

(75) Inventor: Paul D. Okulov, 12 Senneville Road, St-Anne-de-Bellvue, QC (CA) H9X 1B1

(73) Assignee: Paul D. Okulov, St-Anne-de-Bellevue (CA)

( * ) Notice: Subject to any disclaimer, the term of this patent is extended or adjusted under 35 U.S.C. 154(b) by 130 days.

(21) Appl. No.: 10/834,984

(22) Filed: Apr. 30, 2004

(65) Prior Publication Data

US 2005/0000483 A1   Jan. 6, 2005

Related U.S. Application Data

(63) Continuation of application No. 10/160,072, filed on Jun. 4, 2002, now abandoned.

(60) Provisional application No. 60/295,577, filed on Jun. 5, 2001.

(51) Int. Cl.

| | |
|---|---|
| F02B 53/00 | (2006.01) |
| F01C 19/02 | (2006.01) |
| F01C 1/40 | (2006.01) |
| F01C 21/00 | (2006.01) |
| F01C 1/00 | (2006.01) |
| F01C 19/00 | (2006.01) |
| F01C 1/10 | (2006.01) |
| F01C 1/22 | (2006.01) |
| F01C 1/34 | (2006.01) |
| F01C 21/08 | (2006.01) |
| F01C 21/10 | (2006.01) |
| F04C 27/00 | (2006.01) |
| F02B 75/00 | (2006.01) |
| F02B 75/36 | (2006.01) |

(52) U.S. Cl. ........................ 123/241; 60/525; 123/245; 277/357; 418/35; 418/36; 418/61.1

(58) Field of Classification Search ............... 60/39.05, 60/525, 58, 673; 74/63; 123/8, 18 A, 38, 123/65 R, 193.6, 197.5, 222, 229, 234, 240, 123/241, 243, 245, 472; 277/357; 310/42; 418/35, 36, 61.1, 253

See application file for complete search history.

(56) References Cited

U.S. PATENT DOCUMENTS

| | | |
|---|---|---|
| 716,970 A | 12/1902 | Werner |
| 3,228,183 A | 1/1966 | Feller |
| 3,295,505 A | 1/1967 | Jordan |
| 3,387,596 A | 6/1968 | Neimand |
| 3,442,257 A | 5/1969 | Walker |
| 3,614,277 A | 10/1971 | Kobayashi |
| 3,690,791 A | 9/1972 | Dieter |
| 3,918,415 A | 11/1975 | Ishida |
| 3,933,131 A | 1/1976 | Smith |
| 3,950,117 A | 4/1976 | Artajo |
| 3,996,899 A | 12/1976 | Partner et al. |
| 4,042,312 A | 8/1977 | Betts |
| 4,068,985 A | 1/1978 | Baer |
| 4,144,866 A | 3/1979 | Hakner |
| 4,296,936 A | 10/1981 | Wankel |
| 4,308,002 A | 12/1981 | Di Stefano |
| 4,434,757 A | 3/1984 | Walker |
| 4,548,171 A | 10/1985 | Larson |
| 5,036,809 A | 8/1991 | Goodman |
| 5,203,295 A | 4/1993 | Alexander |
| 5,288,217 A | 2/1994 | Contiero |
| 5,305,716 A | 4/1994 | Huttlin |
| 5,305,721 A | 4/1994 | Burtis |
| 5,399,078 A | 3/1995 | Kuramasu |
| 5,404,850 A | 4/1995 | La Bell, Jr. |
| 6,009,847 A | 1/2000 | Huttlin |
| 6,164,263 A | 12/2000 | Saint Hilaire et al. |
| 6,431,139 B1 | 8/2002 | Huttlin |
| 6,718,938 B2 * | 4/2004 | Szorenyi ............ 123/241 |
| 2003/0062020 A1 * | 4/2003 | Okulov ............ 123/241 |

FOREIGN PATENT DOCUMENTS

| | | |
|---|---|---|
| DE | 1451830 | 4/1969 |
| DE | 1295569 | 5/1969 |
| DE | 2226674 | 12/1973 |

| | | |
|---|---|---|
| DE | 2448828 | 4/1976 |
| DE | 3027208 | 8/1981 |
| DE | 3519186 | 12/1986 |
| FR | 2493397 A | 5/1982 |
| GB | 1057372 | 2/1967 |
| WO | WO 8600370 A | 1/1986 |
| WO | WO 09105990 | 2/1991 |

* cited by examiner

*Primary Examiner*—Sheldon J Richter
(74) *Attorney, Agent, or Firm*—Ogilvy Renault; Paul S. Sharpe

(57) ABSTRACT

A balanced rotary cycling machine suitable for use as an internal combustion engine, compressed gas or steam engine, compressor or pump is disclosed herein. The rotor assembly consists of four articulating pistons where the opposite pistons are inter-linked with each other by pivoted rods comprising a parallelogram mechanism and therefore eliminating a need for pivots between pistons. The rotor assembly rotates inside or outside of a circular or non-circular stator depending on the configuration chosen. A variety of mechanisms for shape deformation of four piston assembly during its rotating cycle is also disclosed herein, as well as detailed descriptions of preferred embodiments, including a four cycle internal combustion engine with circular stator, marine engine with polymer parts and a four cycle automobile rotary engine with conventional oil pan. In addition, a method of operation of external rotary combustion engine, employing a high-pressure compressor and an external combustion chamber, is disclosed. This invention also teaches a novel lubrication system for rotary engine providing low emissions. The engine has few moving parts, simplified circular or semi-circular stator shape and utilizes simple and effective sealing techniques. It is fully balanced, has very low friction and heat losses and can employ a pre-designed configuration of the combustion chamber for a desired compression ratio and power output.

42 Claims, 17 Drawing Sheets

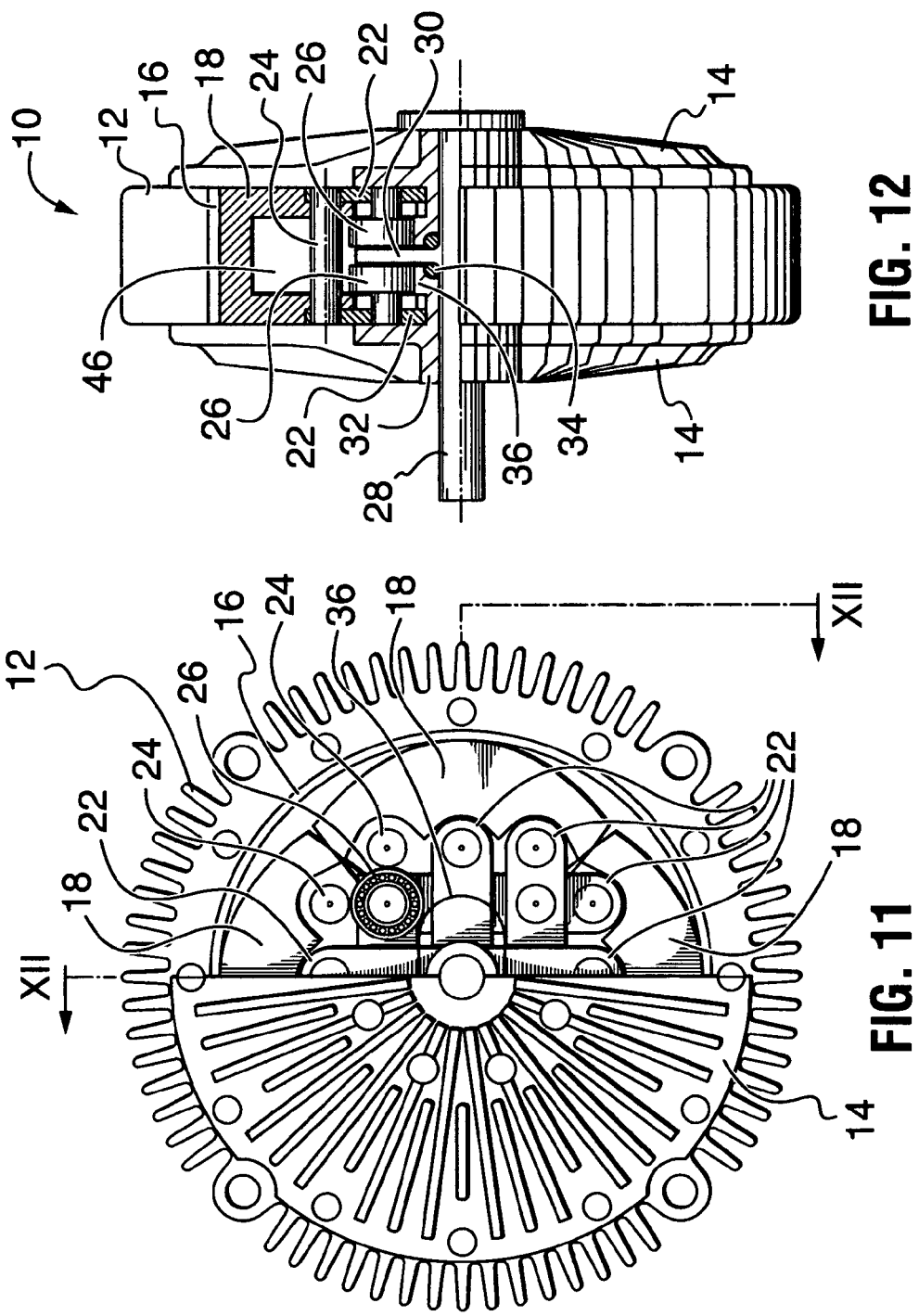

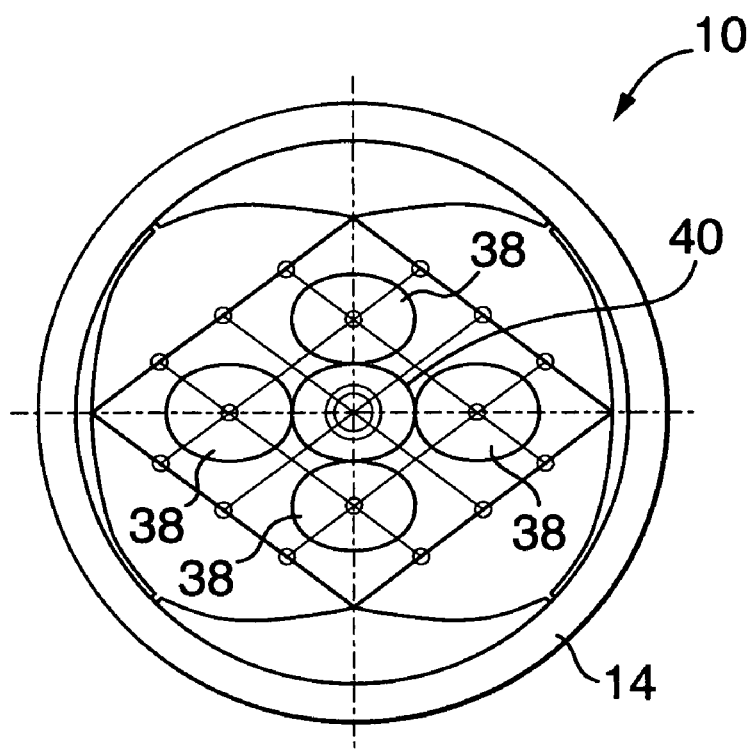
FIG. 13
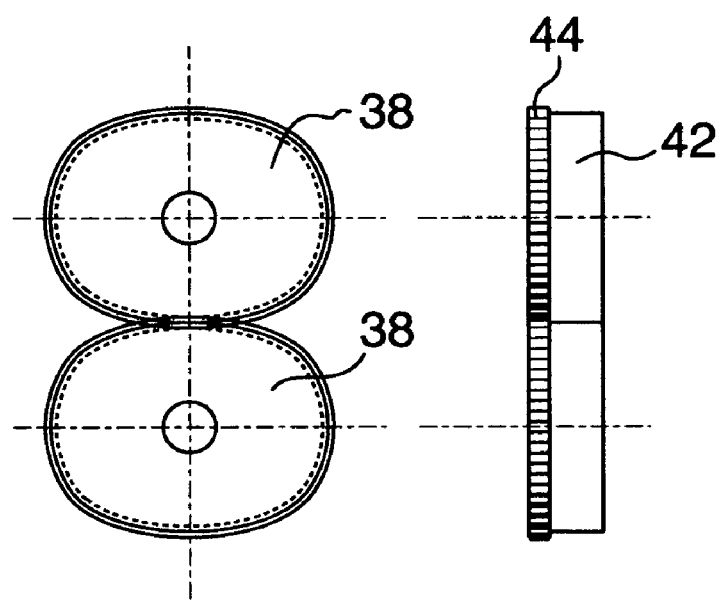
FIG. 14A   FIG. 14B

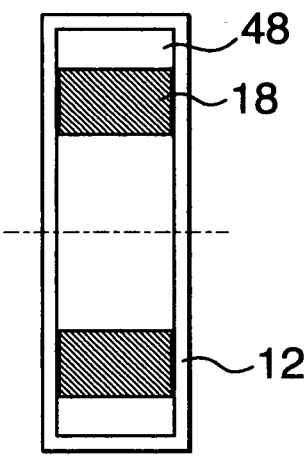
FIG. 15
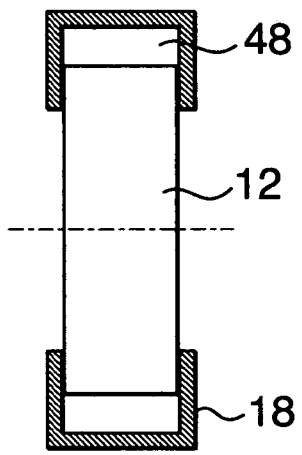
FIG. 16
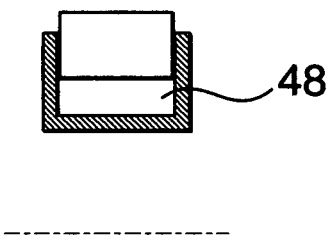
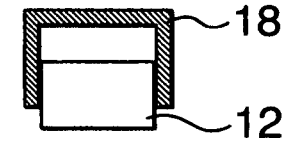
FIG. 17
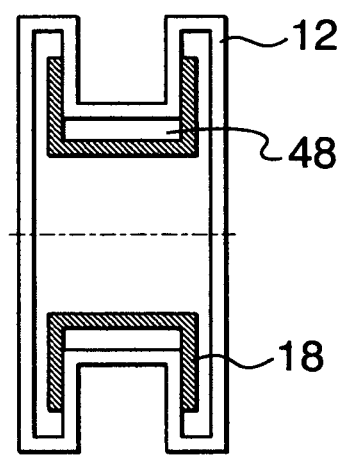
FIG. 18
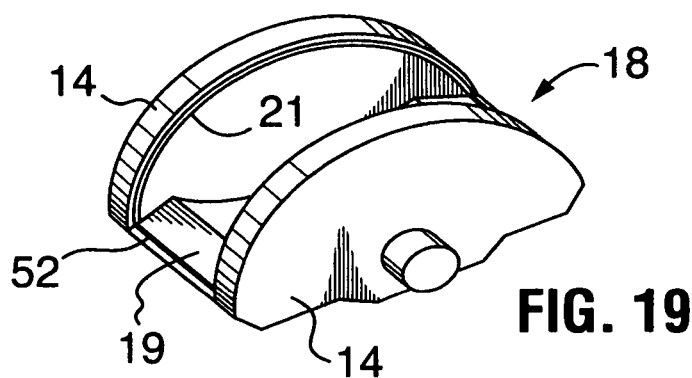
FIG. 19

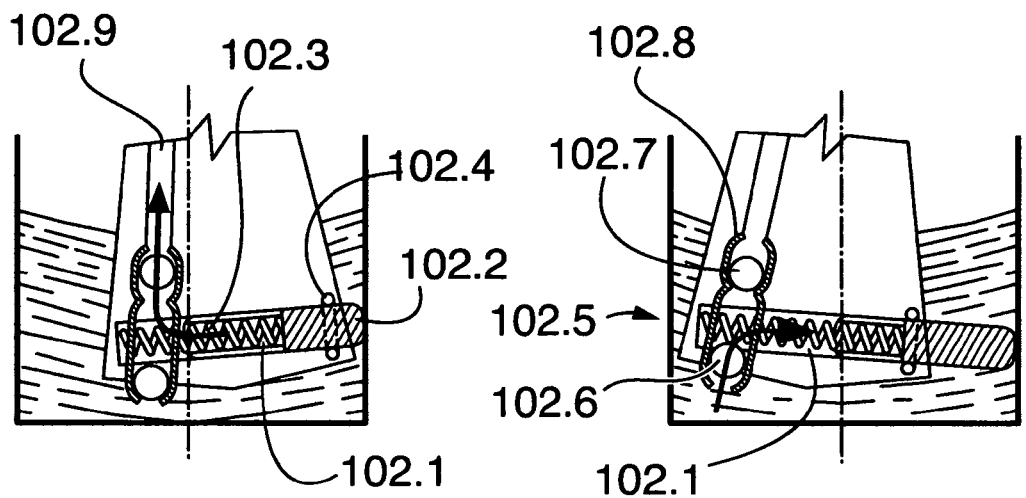
FIG. 25C  FIG. 25D
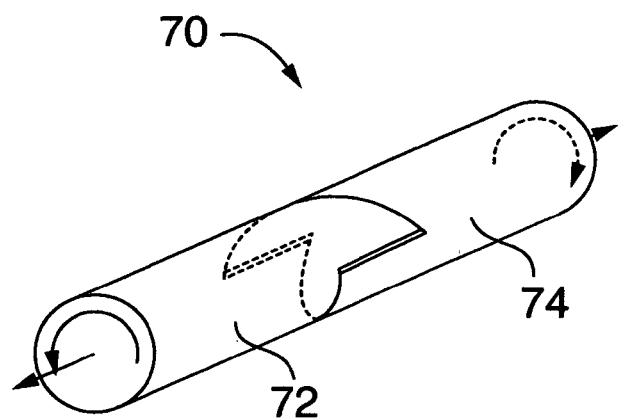
FIG. 26

$C^2 = A^2 + B^2$

BALANCED ROTARY INTERNAL COMBUSTION ENGINE OR CYCLING VOLUME MACHINE

FIELD OF THE INVENTION

This application is a continuation in part of U.S. patent application Ser. No. 10/160,072, filed Jun. 4, 2002 now abandoned, which claims priority from U.S. Provisional Application No. 60/295,577, filed Jun. 5, 2001.

BACKGROUND OF THE INVENTION

Variable shape rotors are known from the prior art, as an example of which was provided by Werner in (U.S. Pat. No. 716,970). Another type of engine was disclosed by Wankel, who established a rotary engine with a fixed shape rotor and epitrochoidal shape stator.

In present invention, during the rotation cycle, the rotor pivoting blades or pistons align alternatively in a lozenge and a square configuration so that the volume between the blades itself, side walls and the stator (contour wall) changes, and in so doing, allows to create a cycling machine.

Rotary engines and cycling machines based on the principle set forth in Edward H. Werner's invention of 1902 (U.S. Pat. No. 716,970) and further inventions developed in greater detail.

German Patent No. 1,295,569, provided a rotary internal combustion engine, in which two pistons are provided, which are connected to the shaft by means of two diametrically opposite arms fixedly connected to the shaft.

A contemporary embodiment of the cycling machine utilizing Werner's principle is described in U.S. Pat. No. 6,164,263, in which roller carriages pivotally connected to the ends of the blades create a lateral support for the rotor and simultaneously provide a cam surface for the rotor shape deformation. In this device, an additional variation of the volume between the blades, side covers and a stator, is achievable due to variation in relative positions of the carriages and blades.

Similar configurations are well known from prior art including U.S. patents by Jordan, Ishida and Niemland. These devices however, do not employ rollers at the end of sealing carriages, save for U.S. Pat. No. 3,387,596, by Niemand where rollers are used in combination with a cam surface for deformation of the shape of a four blade parallelogram.

Parallelogram mechanisms for creating reciprocating movement of the pistons are known from U.S. Pat. No. 5,203,295, issued to Alexander. Multiple applications of unique properties of the parallelogram mechanism are also known, for instance from PCT WO 09105990 by Okulov.

These arrangements are useful, however a common disadvantage exists in that the pivoting blades or links arranged in such configurations are extremely difficult to seal at the pivoting ends.

In respect of the sealing difficulties, different sealing techniques and methods have been described in U.S. Pat. Nos. 3,950,017; 3,690,791; 3,918,41; 4,296,936, etc. Several different types of seals are needed to provide adequate sealing of the device similar to U.S. Pat. No. 6,164,263, which greatly complicates the design and compromises reliability. In addition, the complicated shape of the parts and greater surface area of the combustion chamber both determine high thermal losses and lower efficiency for this type of engine. Eliminating roller carriages in order to create a simpler shape for the combustion chamber (or considering its size near zero) results in the devices similar to those described in a U.S. Pat. No. 3,918,415.

The geometry and numerous configurations of the rotor and stator shapes have been detailed in U.S. Pat. Nos. 3,950,117 and 5,288,217 for different types of variable shape rotors. The shape employed in U.S. Pat. No. 6,164,263 is generally described in the prior art and includes a non deformable rotor having one to four pivoted carriages running in a stator of square or other polygon like shape with rounded corners.

Another variant of a reciprocating cycling machine by Huttlin (as an example see U.S. Pat. No. 6,009,847) employs four two arm levers with the ends of the arms rolling or meshing with each other through gear coupling. The assembly of levers rotates in a circular housing. The disadvantage of the configuration is that the combustion chamber has a very high surface to volume ratio, which leads to thermal inefficiency. Also, the unbalanced lateral forces applied against the cylindrical stator create friction losses and excessive wear of apex seals (FIG. 10) followed by widening of the tolerance gap between levers. This compromises the performance of the already complicated sealing system, reduces the torque and increases complexity of the design.

All these engines have an advantage of being near vibration free contrary to the Wankel and other type of engines with fixed shape rotor or unbalanced pistons. Disadvantages of such engines however exist in that seals at the pivoting ends of the blades or arm levers are complicated. There are still high friction losses due to the significant stress produced by gas pressure and complexity of the shape of the seals and joints.

In addition, the rollers of the carriages are exposed to high temperature combustion gases and suffer from deposition of residue products or plaque from the combustion process. This very complicated configuration of the combustion chamber creates excessive heat transfer to its parts due to large surface area predetermined by the geometry of the pistons (blades). Due to the higher surface area of the combustion chamber/s relative to its volume/s, there are more residues from the non burnt film of the fuel. As in most rotary engines, due to centrifugal action of the rotating rotor forcing the lubricator oil to enter the exhaust, a tendency to have higher overall engine emissions still exists.

There are also well known devices (so-called "cat and mouse" or scissors type engines) realized in a variety of configurations and utilizing principle of creating cycling volumes between rotating inside the circular or toroidal housing pistons or blades. The disadvantage of these engines is the need for creating an external mechanism for variation of the relative position of the pistons. These devices include cams, oval gears, rotating links mechanisms (Rice), etc. Other known types of balanced rotary engines are devices employing cylinders and pistons arranged in a circle and having an activating piston movement cam with a rotating shaft.

Other engines are represented by concepts proposed in the prior art and include a pressure energy converter, rotary engine or compressor as in U.S. Pat. Nos. 4,068,985, 3,996,899; a rotary disk engine as in the U.S. Pat. No. 5,404,850; a rotary planetary motion engine as in U.S. Pat. No. 5,399,078; a rotary detonation engine as in the U.S. Pat. No. 4,741,154; a rotary combustion engine as in DE patent 2,448,828, U.S. Pat. Nos. 3,933,131, 4,548,171, 5,036,809; the Wankel type engine as in the U.S. Pat. Nos. 3,228,183, 4,308,002, 5,305,721, and a continuous combustion engine as in the U.S. Pat. No. 3,996,899. Most rotary engines, and particularly the Wankel and those described in the U.S. Pat.

Nos. 3,442,257, 3,614,277, 4,144,866, 4,434,757, DE Patent No. 3,027,208 are based on the principle of volume variation between a curve and a moving cord of fixed length as a single sliding piston and have the common disadvantage of being unbalanced.

SUMMARY OF THE INVENTION

One aspect of one embodiment of the present invention is to provide an improved rotary internal combustion engine.

The present invention provides an engine or fully balanced cycling volume machine with a variable shape rotor and low internal friction. The engine operates with reduced centrifugal forces on the oil or lubricant distribution and utilizes a conventional oil pan (pool) design solution which proved to be superior to other types of lubrication systems, particularly the ones used in conventional automobile engines.

A further aspect of one embodiment of the present invention is to provide a rotary cycling machine for producing mechanical energy from pressurized fluid as well as to pump, vacuum and compress fluids, comprising:
  a hollow housing having an internal contour wall and having side covers parallel to each other and perpendicular to a central axis of the housing;
  ports in communication with the interior of the housing for intake, exhaust, lubrication or cooling;
  a piston assembly having pistons in spaced relation and mounted for rotational movement within the housing;
  deformation means independent of the contour wall for deforming said piston assembly;
  linkage means connected to opposed pistons for permitting relative movement of oppositely linked pistons, the linkage means being connected to the deformation means; and
  sealing means between pistons of the piston assembly for providing a continuous seal between all pistons of the assembly during rotation.

The housing may comprise a stator and may optionally include a flexible liner which can cooperate with the sealing means to provide a very efficient and well sealed system.

In terms of the piston arrangement, the assembly may comprise a minimum of two pistons depending upon the use of the cycling machine or up to four pistons arranged in a radial disposition and in sealing engagement with one another.

Depending upon the number of pistons, this will obviously vary the linkage means as well. The linkages may comprise a pair of linkage arms or a complete array where a group of arms are arranged for movement subscribing to a parallelogram configuration.

Still, another object of the present invention is to create an effective and simplified engine sealing system.

It is another object to create the possibility of using a simple circular shaped stator and an efficient combustion chamber.

Conveniently, the system of the invention provides for direct and linear transmission of mechanical torque from all four pistons to the shaft.

As an advantage, engine components such as cams, rollers and pivoting parts can be isolated from exposure to combustion gases, while the weight of the engine is reduced and provides for cleaner exhaust.

In view of efficiency of the design, the result is a lower rpm, more efficient engine, utilizing more efficient and less NOx.

The engine provides for lower dead time and is tolerant to different fuels and suitable for photo-detonation mode as well as hydrogen combustion.

Alternatively, another objective is to create an ignition device amplifying the internal pressure during the compression cycle to the point of ignition of air-fuel mixture and to provide an external combustion engine utilizing the compressor and expansion machines as per present invention. In this manner, the present invention provides for a rotary cycling machine for producing mechanical energy from pressurized fluid as well as to pump, vacuum and compress fluids, comprising:
  a pair of rotary machines where the machines comprise:
    a hollow housing having an internal contour wall and having side covers parallel to each other and perpendicular to a central axis of the housing;
    ports in communication with the interior of the housing for intake, exhaust, lubrication or cooling;
    a piston assembly having pistons in spaced relation and mounted for rotational movement within the housing;
    deformation means independent of the contour wall for deforming said piston assembly;
    linkage means connected to opposed pistons for permitting relative movement of oppositely linked pistons, the linkage means being connected to the deformation means; and
    sealing means between pistons of the piston assembly for providing a continuous seal between all pistons of the assembly during rotation;
  a first machine of the machines for compressing a fuel;
  a combustion vessel for combusting compressed fuel from the first machine;
  a second machine of the machines for receiving energy from combustion; and
  a mechanical link between the first machine and the second machine.

The rotor in accordance with one embodiment of the present invention comprises an assembly of four pistons or blades suitable for creating variable volumes during a rotation cycle and having sealed gaps between adjacent pistons and an oval or circular shape stator. Oppositely disposed pistons are pivotally linked to each other creating a parallelogram mechanism and where the intersections of the links are connected to the rotor shape deforming mechanism and are also coupled with the output shaft.

The pistons can have individual seals with the stator and side covers creating variable volume chambers. Alternatively, the pistons may have seals between them, preferably at the centers of their relative rotation. Intake ports, spark plug and exhaust ports are provided either radially in the stator housing, or axially in the side covers, or both of these.

Different sealing techniques are further presented where sealing between pistons and side walls of the stator generally constitute simple linear or curved semicircular spring loaded seals similar to the Wankel type engine seals. Apex seals are arranged either between the pistons and stator contour circular or oval wall or comprise additional seals supported in the mid angle between adjacent pistons and having apex seals with them. Other types of continuous seals when used are also disclosed.

Advantageously, rotation of the rotor provides the pistons rotor to generate cycling volumes thus enabling compression, expansion or vacuum. The engine with four pivoting pistons would have four strokes cycle firing four times per every revolution, practically without dead time.

In a further embodiment of the present invention, there is provided a rotary cycling machine for producing mechanical energy from pressurized fluid as well as to pump, vacuum and compress fluids, comprising:

a hollow housing having an internal contour wall and side covers parallel to each other and perpendicular to a central axis of the housing;

ports in communication with the interior of the housing for intake, exhaust, lubrication or cooling;

a flexible piston assembly mounted for rotational movement within the housing;

deformation means independent of the contour wall for deforming the piston assembly; and continuous sealing means between pistons of the piston assembly for providing a continuous seal between all pistons of the assembly during rotation.

As a particular advantage to the present invention, the flexible piston assembly may be one piece and thus can be extruded, molded or etched or formed by any other suitable manufacturing process. The use of the flexible piston assembly will have a particular value in certain engine types such as small engines used in garden tools, etc.

The design of the engine also provides for an engine configuration capable of creating a jet propulsory system and creating an engine for water crafts employing polymer plastic or composite parts cooled directly in the water.

In accordance with a further object of one embodiment of the present there is provided a rotary cycling machine for producing mechanical energy from pressurized fluid as well as to pump; vacuum and compress fluids, comprising:

a hollow housing having a stator wall and having side covers parallel to each other and perpendicular to a central axis of the housing;

ports in communication with the interior of the housing for intake, exhaust, lubrication or cooling;

a piston assembly surrounding the stator wall;

deformation means independent of the stator wall for deforming the piston assembly;

linkage means connected to opposed pistons for permitting relative movement of oppositely linked pistons, the linkage means being connected to the deformation means; and sealing means between pistons of the piston assembly for providing a continuous seal between each piston and the stator of the assembly.

The engine described above is particularly useful in the marine applications since the blades or propulsors of different varieties can be directly mounted onto the pistons which orbit the stator.

In terms of the ports for exhaust dispersion and intake, the exhaust port may be positioned so that the exhaust is discharged directly into a water stream in the event that the engine is used as a marine engine with an intake in a position suitable for fuel intake, air intake, etc.

In accordance with a further object of one embodiment of the present invention there is provided a linkage mechanism for linking piston members in a rotary engine, said engine having a stator and piston members, comprising:

first linkage arms having spaced apart ends;

second linkage arms having spaced apart ends arranged in a parallel plane relative to the first linkage arms;

connection means at each end of the spaced apart ends of the arms for movably connecting opposed pairings of the piston members;

roller means connected to arms of the first arms and the second arms for facilitating movement between connected arms of the first arms and the second arms; and cam means about which the rollers orbit for movement of the piston members.

The arrangement is particularly effective for advancement of the pistons and, as discussed herein previously, the movement of the linkage arms essentially moves from a substantially square arrangement to a rhomboidal arrangement and is conveniently positioned between the space defined by the pistons.

By making use of a pair or several groupings of the cycling machines, an efficient energy producing apparatus can be formulated for a variety of different uses.

Having thus generally described the invention, reference will now be made to the accompanying drawings, illustrating preferred embodiments.

BRIEF DESCRIPTION OF THE DRAWINGS

FIG. 11 is a plan view of the preferred embodiment with part of the side cover and links not shown;

FIG. 12 is a sectional view of the engine along line 12—12 of FIG. 11;

FIGS. 13 through 14B illustrate methods of deformation of pistons assembly utilizing non-circular gears and/or rollers;

FIGS. 15 through 18 illustrate variants of stator and rotor possible arrangements;

FIG. 19 is an enlarged view of the described piston bed surrounding the contour wall with side covers;

FIGS. 25 through 25D illustrate the machine and a lubrication system therefor;

FIG. 26 is a perspective view of a seal element;

DETAILED DESCRIPTION OF THE PREFERRED EMBODIMENTS

Figure 1:
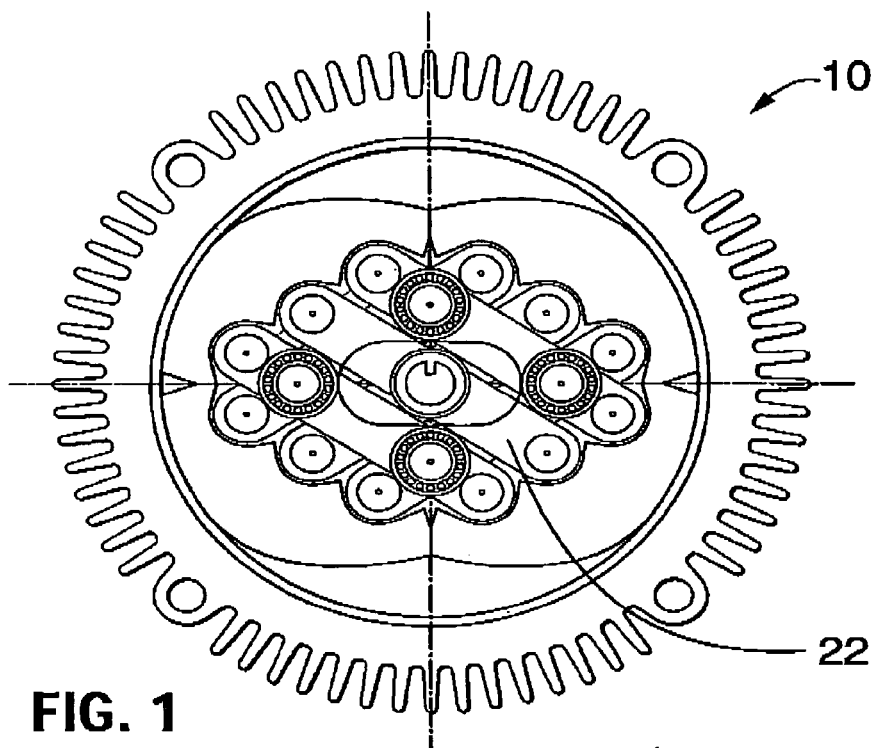
FIG. 1 illustrates four segmental articulating pistons arranged in a lozenge configuration.

FIG. 1 illustrates a cross-sectional view of the rotary apparatus, generally denoted by numeral 10. FIGS. 11 and 12 illustrate a side and partially cutaway view of the arrangement 10, respectively. With respect to FIGS. 1, 11 and 12, the arrangement 10 provides a housing 12 having end covers 14 within which is disposed a stator 16. The stator is shown in the example as a circular arrangement; however, the arrangement may also be of a semi-circular shape or have an adjustable liner to be discussed hereinafter.

Disposed within the housing 12 is a plurality of pistons 18, shown in the example in a quantity of four. As is illustrated, the pistons 18 have a general arc shape for contact with the stator 16. The internal area of the pistons includes a plurality of generally rounded or scalloped portions 20. The scalloped portions are configured to permit general movement of linkages 22.

As illustrated, diametrically opposed pairings of pistons 18 are connected by linkages 22. Each of the linkages 22 includes at either end connecting axles 24. In this manner, each of the linkages allows for movement of the piston 18 relative to the linkage 22, the movement being accommodated by the piston scalloped sections 20.

As illustrated in FIG. 1, the linkage arms 22 for an opposed pairings of pistons 18 overlie the linkage arms 22 of the opposing pairing of pistons. In order to connect the opposed individual pairings of pistons 18, the overlying linkage arms 22 are connected together for relative movement. This is achieved by axles of rollers 26 which connect alternating individual linkage arms of one layer with similar arms from the second layer. Accordingly, the linkage arms 22 are effectively arranged in an array with the rollers 26 connecting alternating arms of the first array or top layer with the similar arms from the second array or underlying group of linkage arms 22. This effectively connects the linkage arms 22 of opposed pairings of pistons 18 with the second opposed pairing. As is illustrated in FIG. 1, rollers 26 are positioned at the point of intersection between connected first layer and second layer linkage arms 22.

Extending through housing 12 and covers 14 there is provided a central shaft 28 having a generally cross-shaped coupling member 30, which member 30 includes slots for engagement with the axes of rollers 26. This is best illustrated in FIG. 11. A central shaft support 32 is coaxially arranged about central shaft 28 and includes radial and thrust bearings 34.

Figure 2:
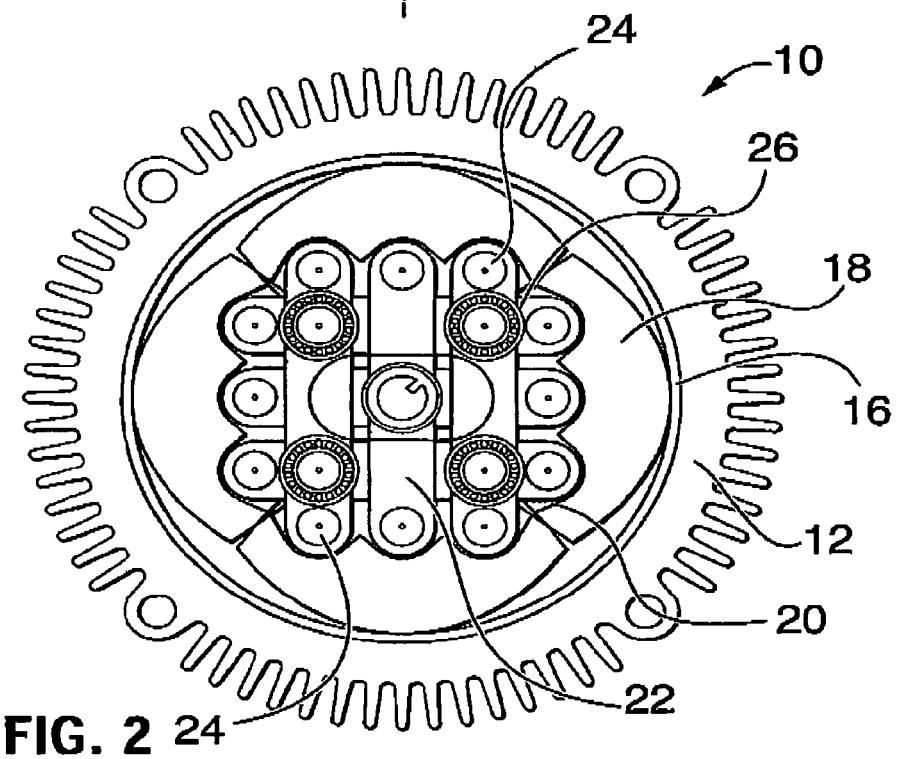
FIG. 2 illustrates the pistons arranged in a square configuration.

Generally speaking, the shape of the rotor assembly changes from the lozenge shape of FIG. 1 to the square configuration as illustrated in FIG. 2 under influence of a piston deformation assembly. As illustrated in FIG. 1, the arrangement of the rollers 26 effectively changes from a rhomboidal configuration to a substantially square configuration under the action of the deformation mechanism. As an example, the deformation mechanism can comprise a cam member or members 36. In the example, the shape of the cam 36 is generally ovular and symmetrical, however it will be understood that the underlying concept with respect to the shape is that the same must include at least one minimum and one maximum curvature. In this regard, although illustrated in ovular shape, by consideration of the minimum maximum curvature other shapes are clearly within the realm of possibility including prolated circular structures. The cam arrangement 36 may be an integral part of the shaft support 32 or, in the alternative, the deformation mechanism can include non-circular gear arrangements or pivoting members or others. An example of the alternative is illustrated in FIGS. 13 through 14B. In this arrangement, the deformation arrangement may include non-circular gear members 38 together with central static gear 40 comprised of cylindrical member 42 having teeth 44.

In use, and returning to the arrangement in FIGS. 1, 11 and 12 by virtue of the rollers 26 and the disposition of the axes being at intersections of the links 22, the deformation system allows rocking of the system against the cam arrangement.

As briefly mentioned herein previously, FIG. 2 illustrates the configuration of the linkage arms 22 in the generally square configuration with respect to rollers 26.

In FIGS. 3 through 8, the overall operation of the arrangement is shown, however, it is to be noted that in this embodiment only four linkage arms 22 are shown. The ports for intake and exhaust are denoted by numeral 46a and an example of a spark plug is denoted by numeral 26a. As pointed out previously, the arrangement of the linkage arms 22 and specifically the disposition of the rollers 26 relative to one another, alternatively changes from a rhomboidal configuration to a square configuration.

Figure 3:
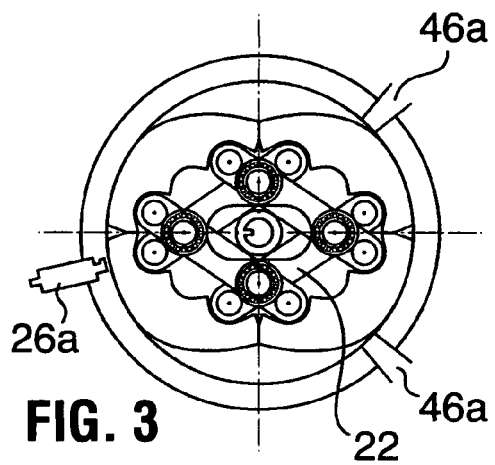
FIGS. 3 through 8 illustrate cycles of the engine operation.
Figure 4:
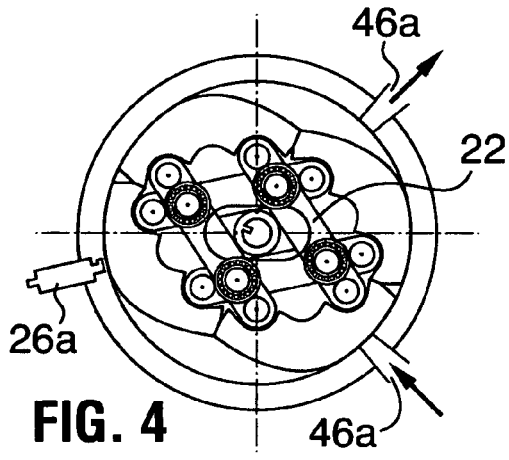
Figure 5:
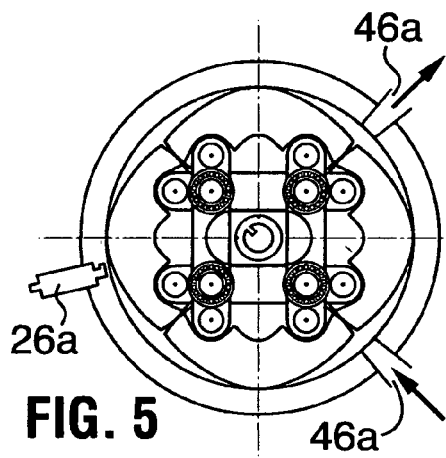
Figure 6:
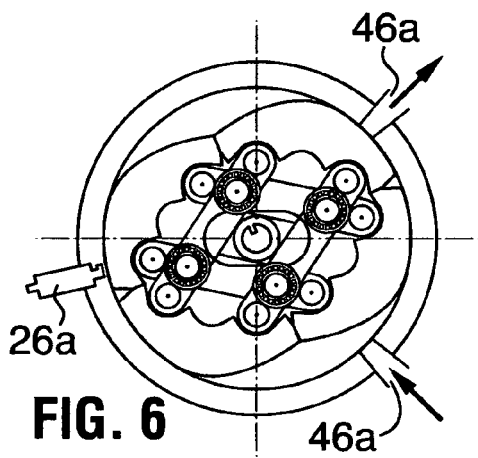
Figure 7:
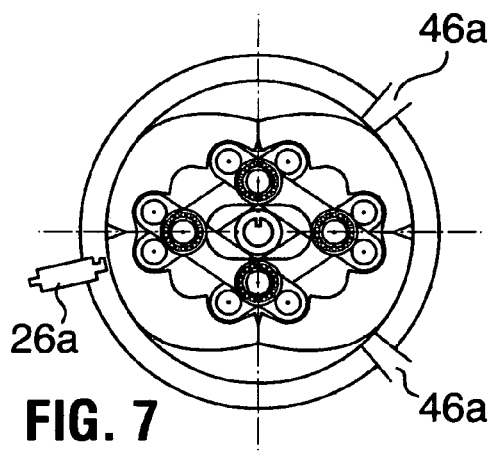
Figure 8:
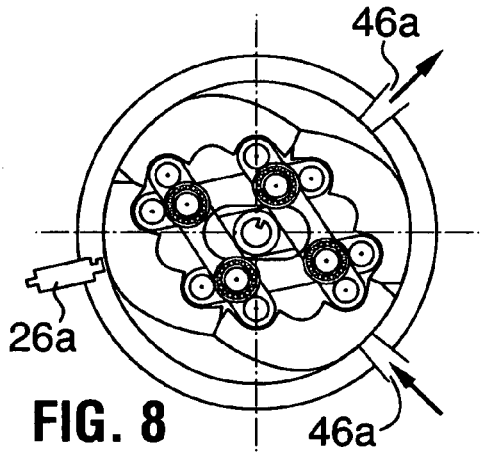
Figure 9:
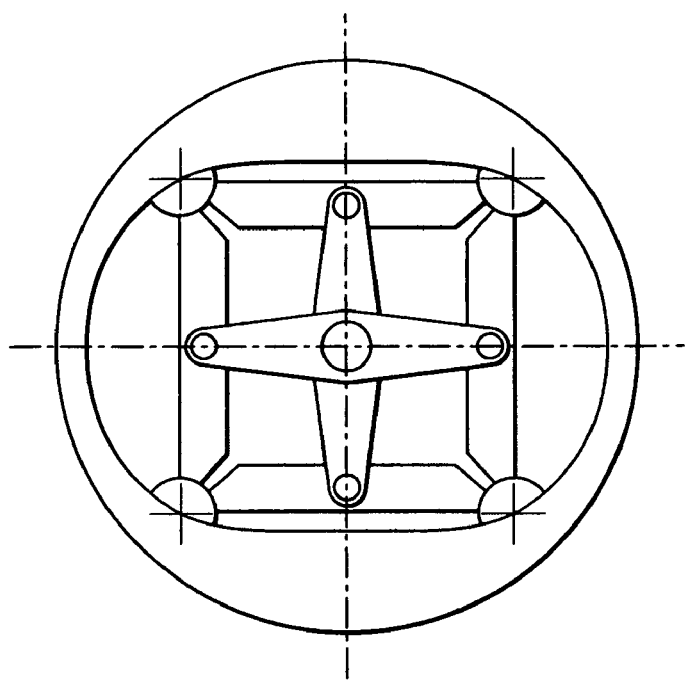
FIGS. 9 and 10 illustrate the prior art arrangements.
Figure 10:
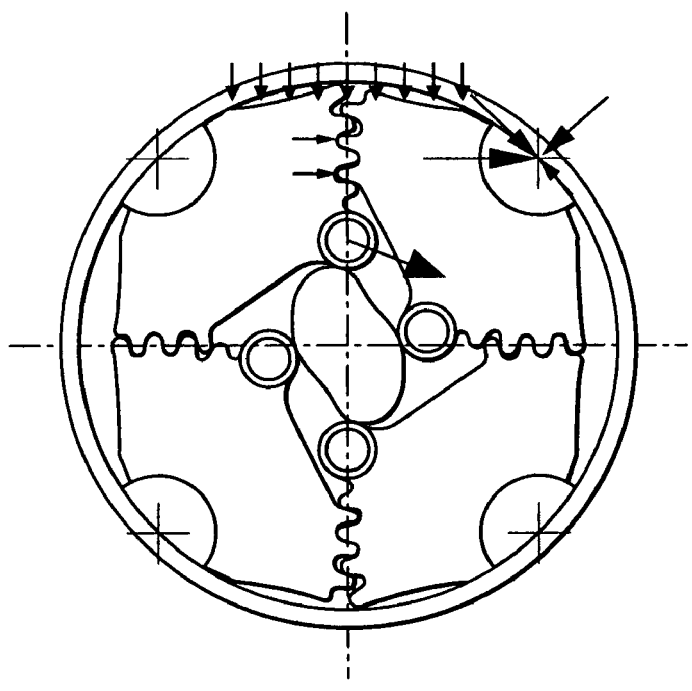

It will be appreciated by those skilled in the art that by a simple variation of the number of intake ports and exhaust ports, the arrangement shown in FIGS. 3 though 8 can be modified so that the engine can operate as a two-cycle or two-stroke engine. As a further alternative, the inner-cycling volume of the engine, i.e. volume between the pistons, or an external blower may also be utilized.

One of the primary advantages of the engine set forth herein is realized by the fact that the deformation mechanism is not part of the stator, rotor or contour wall. This easily permits adjustment of the properties to burn different fuels, create different compression ratios, modify the relationship between the combustion/intake/expansion chambers volume and angles of the rotor assembly rotation. Clearly, this translates into an arrangement where horsepower can be augmented with relative ease without having to extensively reconstruct the arrangement or simply discard the housing rotor, etc. This has significant advantages and has not been previously proposed in the art view of the limitations in the structures of the prior art.

In greater detail with respect to the pistons 18, the same may include a hollow volume 46 as illustrated in FIG. 12, the purpose for which will be discussed hereinafter. The number of pistons 18 will vary from one application to another with a minimum of two pistons. A "chain-like structure" can be achieved with multiple chambers or a "wavy" disc coupled with a single or multiple tiltable chambers. This configuration may effectively be used in pumps, pneumatic breaks for vehicles (a pump with a closed output and a "wavy" disc like stator), propulsors for a watercrafts, etc. A variety of possible arrangements of pistons 18 and stators 12 are shown in FIGS. 15 through 18 where chambers 48 are created between them.

In respect of the sealing system of pistons surrounding the contour wall and which may be incorporated into the present invention, pistons 18 as illustrated in FIG. 19 as an example, may include lateral seals 50, generally disposed along the inside wall of the side covers 14 with additional seals 52 for contact with the contour wall or "wavy disk stator/rotor" (not shown).

Figure 20:
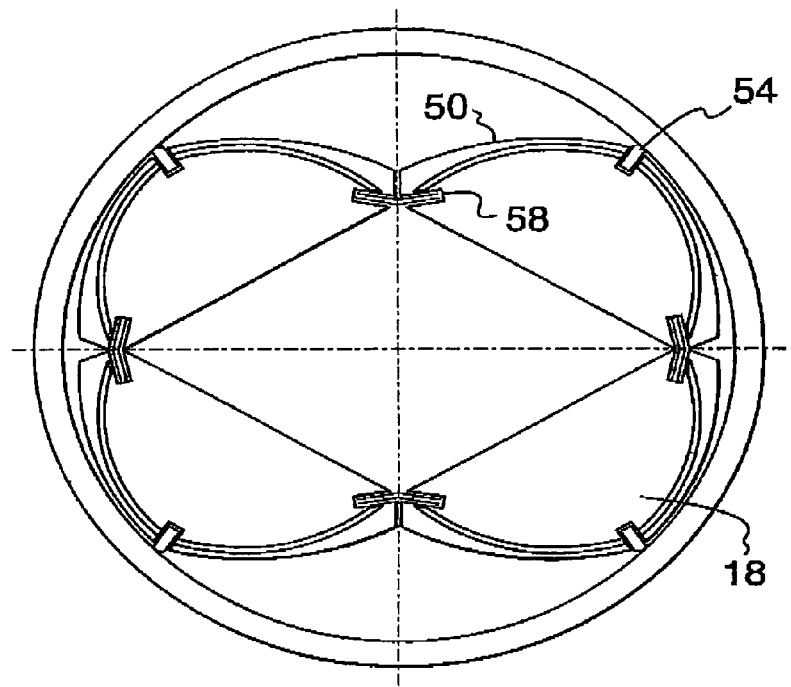
FIGS. 20 through 22 illustrate the sealing system according to one preferred embodiment.
Figure 21:
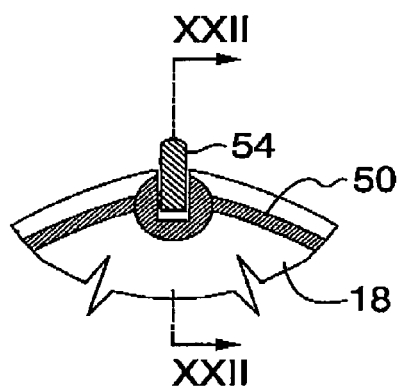
Figure 22:
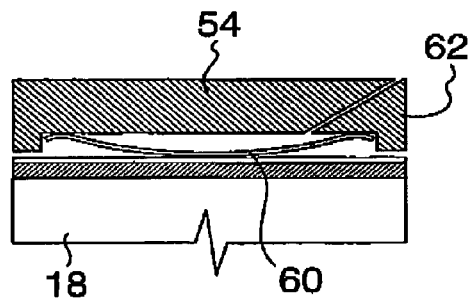
Figure 23:
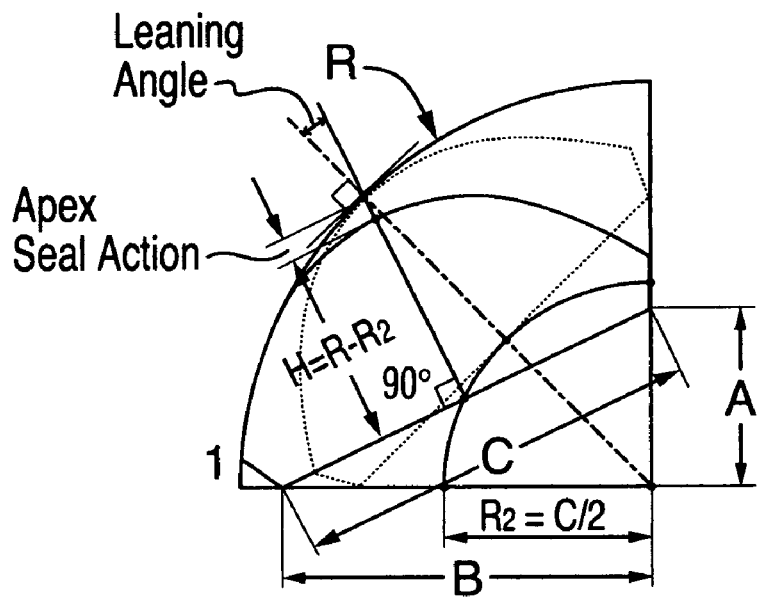
FIG. 23 is a representation of the geometry of the outer portion of a segmental piston (providing for a minimum volume between the piston and contour wall)

FIG. 20 illustrates additional sealing arrangements where the individual pistons include apex seals 54, lateral seals 50 and inter-piston seals 58. FIG. 21 illustrates an enlarged section of the apex and lateral seal system. FIG. 22 illustrates preferred configuration for the sealing where a spring 60 loads the apex seal 54 and apex seal 62. This arrangement is similar to the Wankel-type engine seals, however, the advantage with this arrangement is that there is a much more favourable leaning angle associated with the apex seals. This is found to be best when the leaning angle is not greater than 10 degrees compared to between 16 and 30 degrees for Wankel-type engines. In respect of the leaning angle, reference can be made to FIG. 23. The inter-piston seals 58 can be arranged in the form of flexible members.

Figure 24:
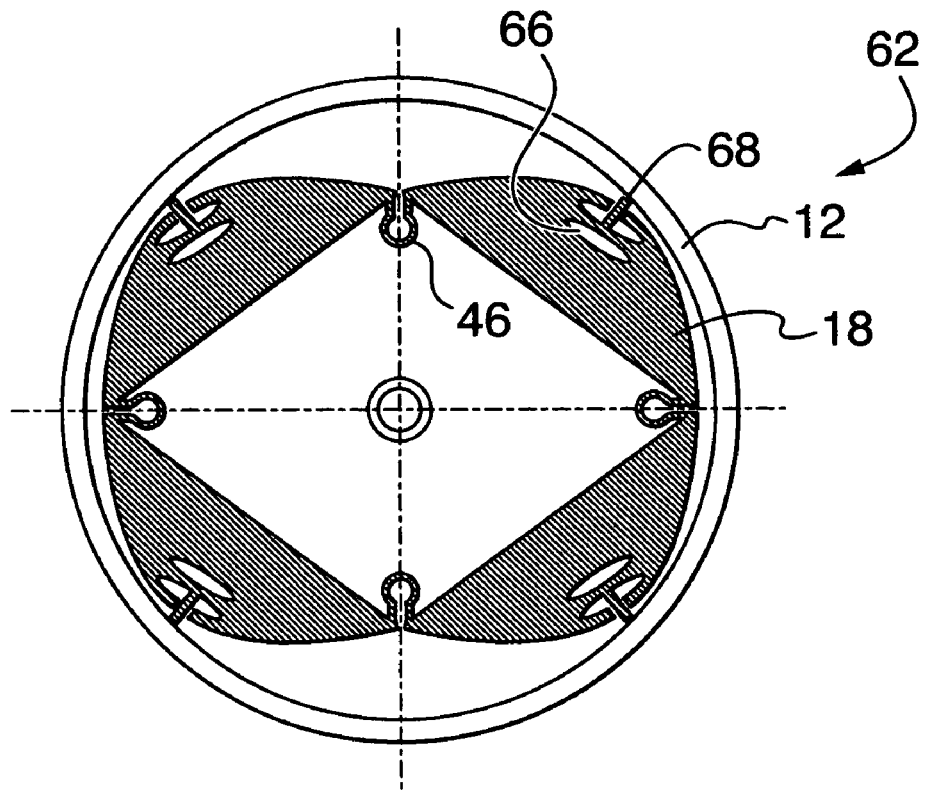
FIG. 24 illustrates a variant of the rotor assembly with flexural pivots between pistons and flexural apex seals.

As a further variation, continuous seals may also be employed in combination with a toroidal stator or toroidal shape rotor pistons. The seals are as effective as conventional piston engine seals. One of the beneficial features of the arrangement is that the rotor assembly and seals, shown in FIG. 24 and represented by numeral 62, can be a one-piece molded, extruded or etched part with pistons 18, inter-piston flexural links 64 with spring loaded flexible apex seals with the spring being noted by numeral 66 and apex seal 68.

Figure 27:
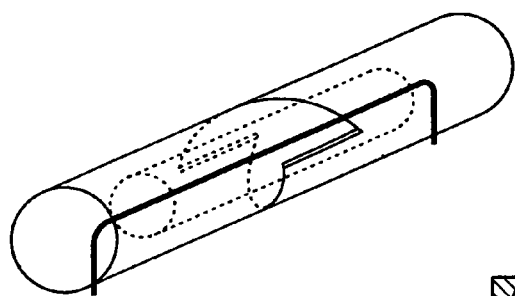
FIG. 27 is a perspective view of a seal for use in the machine.
Figure 28:
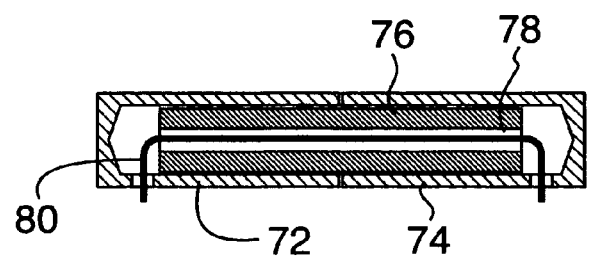
FIG. 28 is a longitudinal cross-section of FIG. 27.
Figure 29:
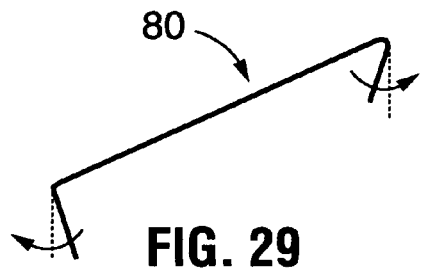
FIG. 29 is a perspective view of the spring for use in the seal of FIGS. 27 and 28.
Figure 30:
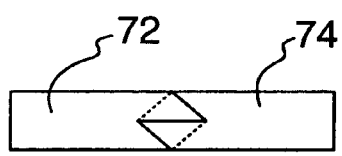
FIG. 30 is a view of the seal in one embodiment.
Figure 31:
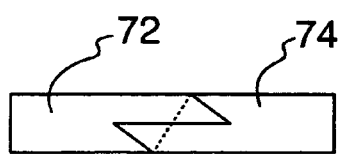
FIG. 31 is a view of the seal in another embodiment.

Turning now to FIGS. 25 and 26 through 32, shown is a further variation on the sealing arrangement according to the present invention. As a particularly attractive arrangement, the inter-piston seals according to the embodiment shown in FIG. 25 and generally denoted by numeral 70 may comprise a generally cylindrical structure which may include a plurality of sections 72 and 74 where the sections are moveable relative to one another. The cylindrical sealing element 70 may be tubular and include a sealing insert 76 disposed coaxially therein. The sealing insert, 76 also may include a longitudinal bore 78 within which is disposed a torsional spring 80. The spring 80 and insert 76 are disposed within the cylindrical sealing element such that the end portions of the spring are turned downwardly and extend through the insert as illustrated in FIG. 28. The sealing member may be isolated into the sections 72 and 74 by a zigzag cut or by a helical cut as illustrated in FIG. 27.

Figure 32:
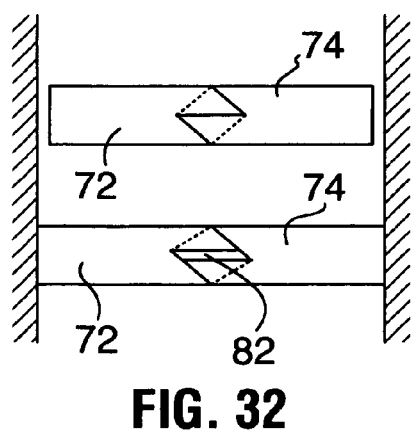
FIG. 32 is a schematic representation of the seal of FIGS. 30 and 31.

The spring 80 is a torsional spring and would facilitate rotation in opposed directions of the individual segments 74 and 76 which in turn will facilitate axial movement of said segments. This is best illustrated in FIG. 32 where the arrangement is shown where the sections 72 and 74 are connected and secondly where the sections have slightly pulled apart from one another, thus introducing a gap 82 between the sections 72 and 74. By providing the tortional spring, the seal can provide both axial, i.e. in the direction of the central shaft sealing, as well as radial sealing. In this manner, the seal is effectively a "dynamic" seal and adjusts by movement of the body itself relative to stresses experienced during rotation of the pistons. In the radial direction it acts similar to a ball-type valve where external pressure only facilitates its sealing capability.

Materials for construction of the seals discussed herein will be selected from the materials well-known to those skilled in the art for sealing environments where significant stresses and wear conditions are encountered as well as high heat and thermal expansion of the seals.

Figure 33:
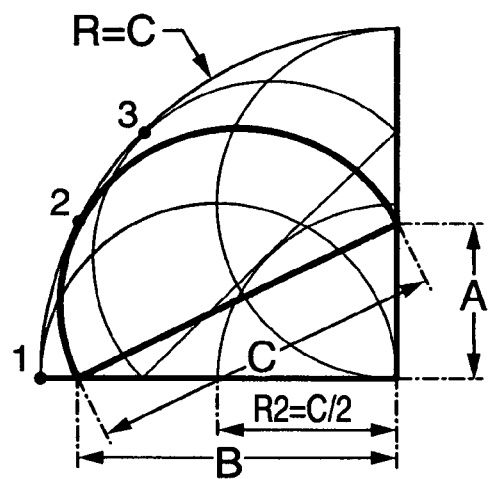
FIG. 33 is a representation of the geometry of one quadrant of the engine circular contour wall and with possible positions of one of the segmental pistons.
Figure 34:
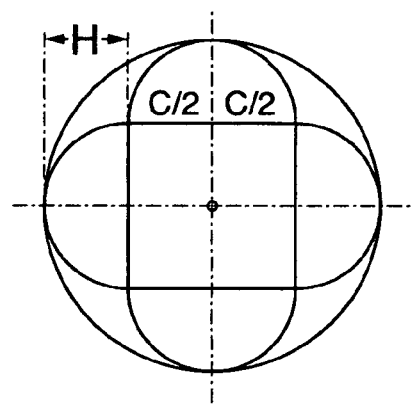
FIG. 34 illustrates the geometry of the circular stator (contour wall) and half circle shape of segmental pistons.
Figure 38:
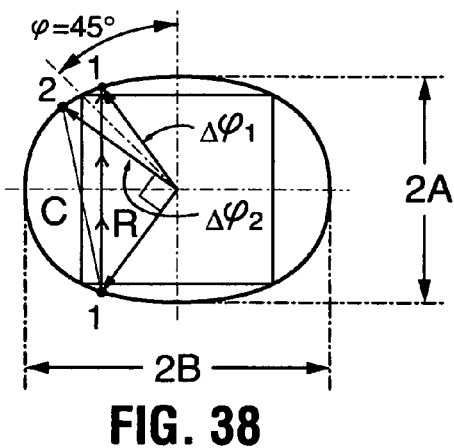
Figure 38A:
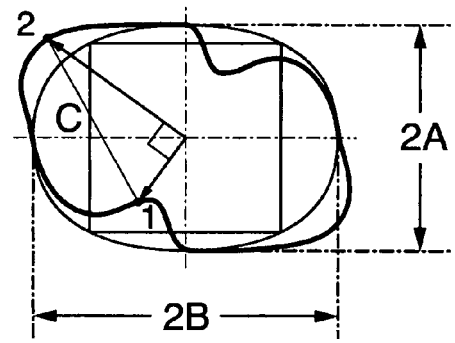

Returning now to a discussion on the pistons, the height of each piston may be approximately equal to half of its length. See as illustrated in FIGS. 33 and 34. This provides a minimum variation in the clearance between the top of the piston and the contour of the stator circular wall as graphically illustrated in FIG. 23. As an example, with a stator inner-diameter of 100 millimeters (4 inches) the length of the piston may be 54 millimeters (2.13 inches) with the height comprising 23 millimeters (0.9 inches). The variation in the gap between the apex of the piston found at apex seal 54 (FIGS. 20 and 21) will be in the range of between 0 and 0.3 millimeters (0–0.012 inches). This minor variation be can easily accommodated by movement in the seating of the seal. Alternatively, this variation can be canceled by providing a slightly non-circularly shaped stator by either machining or deforming a flexural stator or liner. This is generally illustrated in FIGS. 38 and 38A.

The "ideal geometrical configuration" (as established in FIGS. 33 and 34) involves piston segments of equal to or less than twice the radius of the stator contour wall. Sealing in this configuration in high RMP devices can employ the "close to zero" gap technique where, depending on the density of the working fluid, very sufficient pressures can be achieved without seals at all, but with minimum clearance between the parts. This particular configuration would be preferable with ceramic, composite or plastic parts employed which may be especially advantageous for lubricant-free engines as well as in micro-engines etched from silicon-based materials.

Figure 35:
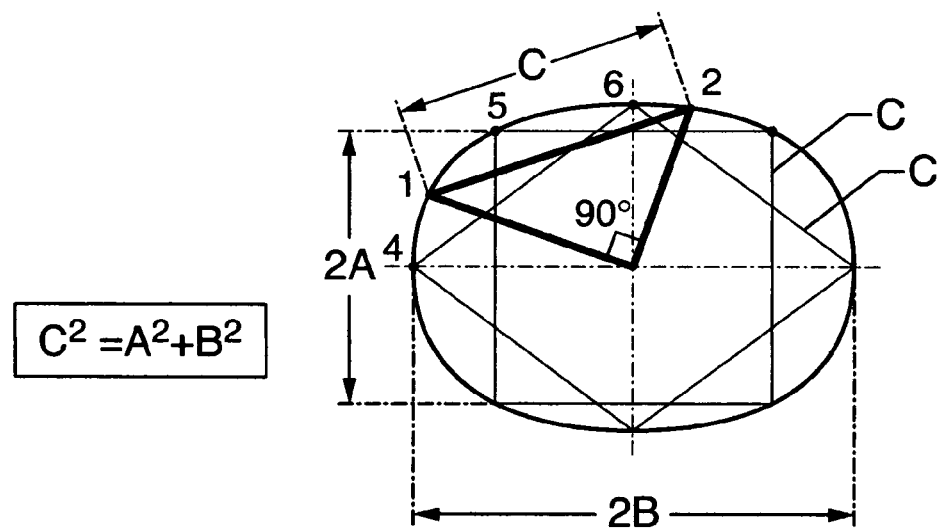
FIG. 35 is a representation of the geometry of the cycling machine with a non-circular shape, symmetrical contour wall or cam surface.
Figure 36:
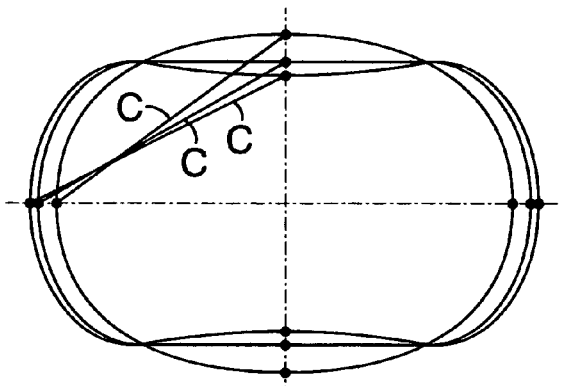
FIG. 36 illustrates variations of possible shapes of a symmetrical non-circular contour wall or cam surface.

The geometry of other variations and details of engines and cycling volume machines is set forth in Figures provided herein. The variation shapes of the "oval" stator or geometry of the cam surfaces (FIGS. 35 and 36) as well as their semi-symmetrical types (FIG. 38A) and other parameters are numerous and may be analyzed using mathematical analysis techniques.

Figure 37:
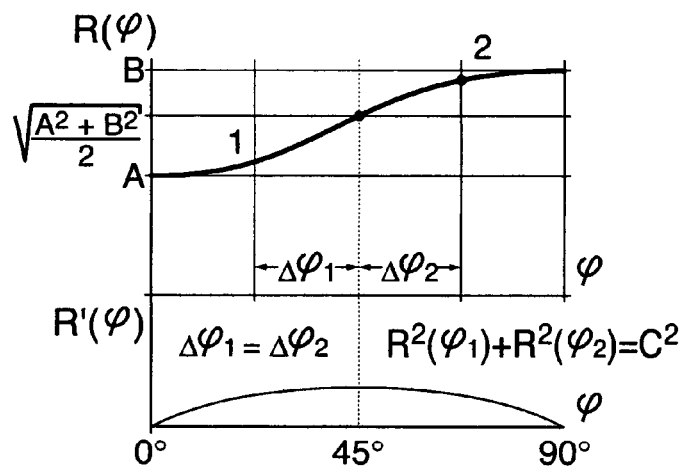
FIGS. 37 through 38A illustrate the method of mathematical definition of the contour wall or cam geometry, particularly with non-symmetrical configuration described in a FIG. 38A.

The geometry chosen will determine the compression ratio and displacement of the engine. The shape of the curve must conform with two points, namely points 1 and 2 in FIG. 35 or FIG. 38A. The distance between the points must equal the side of the $C^2$ and a polar angle between them must be equal to 90 degrees. Such a curve has an infinite amount of geometrical solutions predetermined by the ratio A/B and by at least one fragment of the curve between points 4 or 6 and 5 which are reference points for all possible curves with a similar ratio of A/B. Point 5 is a common reference point for all possible symmetrical curves. FIGS. 37 through 38A illustrate the method of mathematical definition of the contour wall.

As a particularly favourable feature of the present invention, the compression ratio of the instant engine is not limited by its geometry, which is contrary to the Wankel-type engine where the compression ratio cannot exceed 15.5:1 for a three-lobe rotor. The displacement of engines made in accordance with the present invention is to be compared to a four-cylinder, four-cycle engine since it will have an equal number of power strokes per one revolution of the shaft. As an example, the circular stator shape engine of the present invention with the displacement of 2.7 liters will have a contour wall diameter of approximately 12 inches and a thickness of 3.3 inches.

In a preferred embodiment, central shaft 28, as indicated previously has a cross-leg shape coupling member 86 with slots 88 where engaging the axes of the linkage arms 22. As an alternative, the torque and lateral forces resulting from the pressure within the housing 12 can be transferred through the pistons depending on the configuration chosen.

Figure 39:
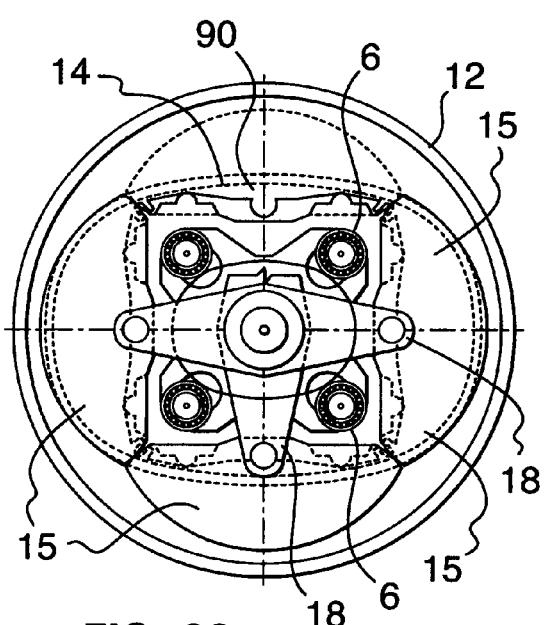
FIG. 39 is a variant of the engine with combustion chambers defined by a contour wall and pistons surrounding it.
Figure 40:
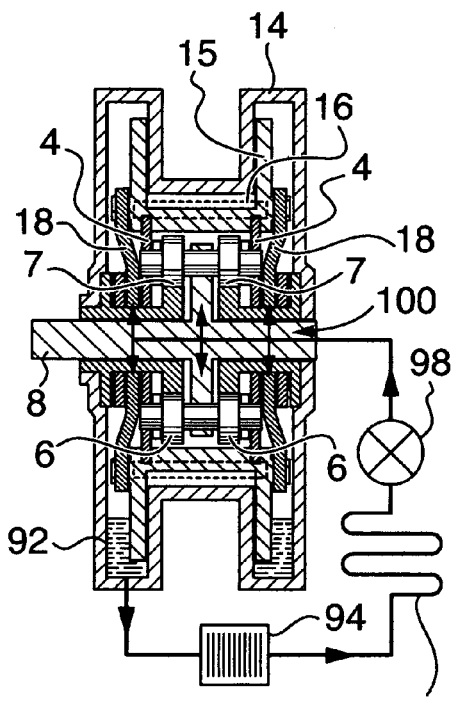
FIG. 40 is an elevational view of the engine of FIG. 39 schematically illustrating the lubrication system and oil pan.
Figure 41:
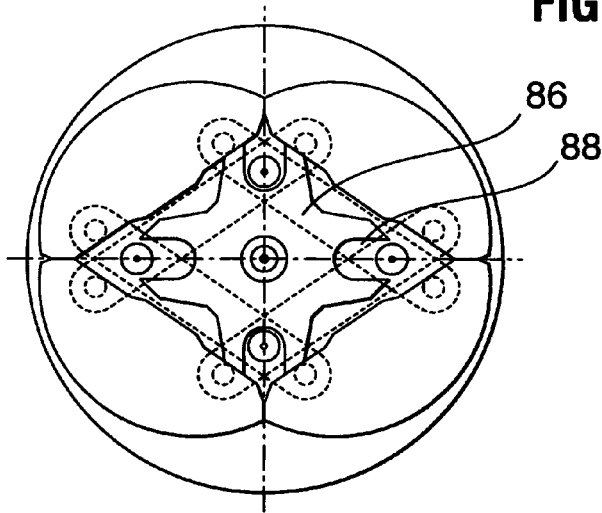
FIG. 41 is another view similar to FIG. 13 showing the piston assembly in lozenge configuration.

Referring now to FIGS. 39, 40, 19 and 41, the engine with a non-circular or oval-shaped stator 16 may be provided with different types of chamber arrangements. In one possible embodiment, as illustrated in FIG. 39 there is included the housing 12 having the pistons surrounding the stator ring from the inner or outer portion of the stator ring to create a corresponding number of chambers 90. In the situation where the pistons are positioned inwardly, the possibility exists to employ a conventional oil pan 92 (FIG. 40) for lubrication which simplifies the design, improves reliability and provides for low emissions.

The lubrication can include a filter 94, oil radiator 96 and pump 98. The distribution can be effected through central shaft 28 having passages 100 there through. The distribution can be assisted by centrifugal forces which will facilitate circulation.

Figure 25:
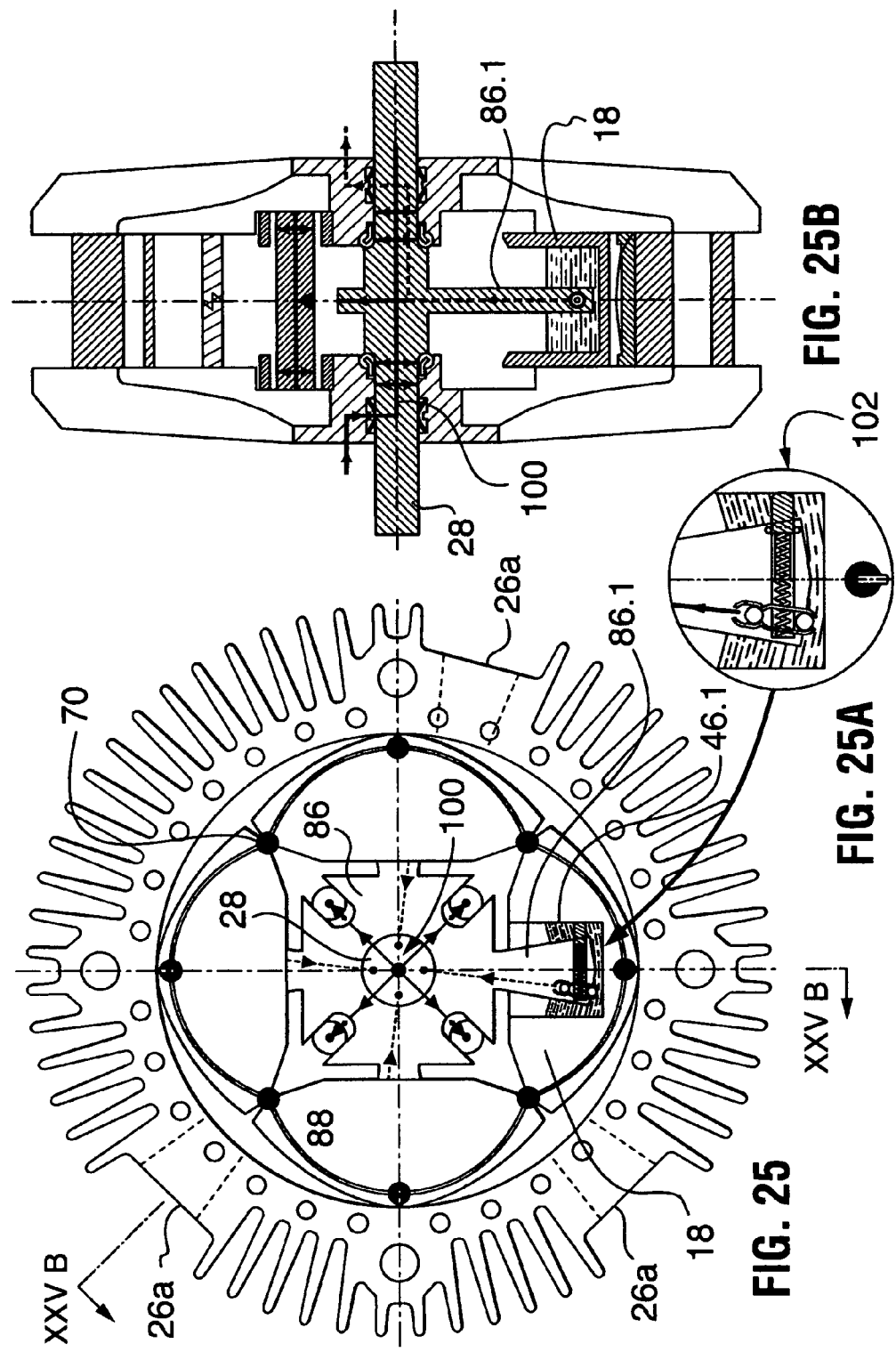

Returning to FIGS. 25 through 25D, shown are greater details concerning a lubrication system according to further embodiments of the present invention. In respect of FIG. 25, as discussed with respect to FIG. 40, the central shaft includes passageways 100 within which the oil may be dispersed. In the embodiment of FIGS. 25 and 25B, the pistons 18 include within the hollow areas 46 lubricant or oil which can be recirculated through the system via the pistons and central shaft 28. To this end, the pistons may include oil pumps, globally denoted by numeral 102 and illustrated in FIG. 25A. As illustrated in FIG. 25A, the overall oil pump mechanism is part of the extensions of the central shaft 28 and is immersed in the oil 46.1. Within piston 18, as discussed herein previously, there is a chamber within which the pump mechanism 102 operates. In greater detail, FIGS. 25A, 25C and 25D illustrate the components of the pump mechanism. Generally speaking, within the body of the piston 18 there is a chamber 102.1 within which a moveable plunger 102.2 is slidable from the position shown in FIG. 25C to the position shown in FIG. 25D. Plunger 102.2 is actuated by a spring member 102.3 disposed within or adjacent to the body of the plunger 102.2. An O-ring member 102.4 facilitates sealing of the plunger 102.2 during its movement (extension and retraction) shown in FIGS. 25D and 25C, respectively. A ball valve assembly, generally denoted by numeral 102.5 is positioned about the opening 102.1. The assembly includes ball valves 102.6 and 102.7 which are retained by retaining member 102.8. As is evident from FIGS. 25C and 25D the ball valves 102.6 and 102.7 and plunger 102.2 cooperate during articulation of the pistons 18 such that oil is either admitted as shown in FIG. 25D or discharged as shown FIG. 25C where the discharge of the oil is passed through channel 102.9 for eventual readmission into the channels 100 of central shaft 28.

Figure 42:
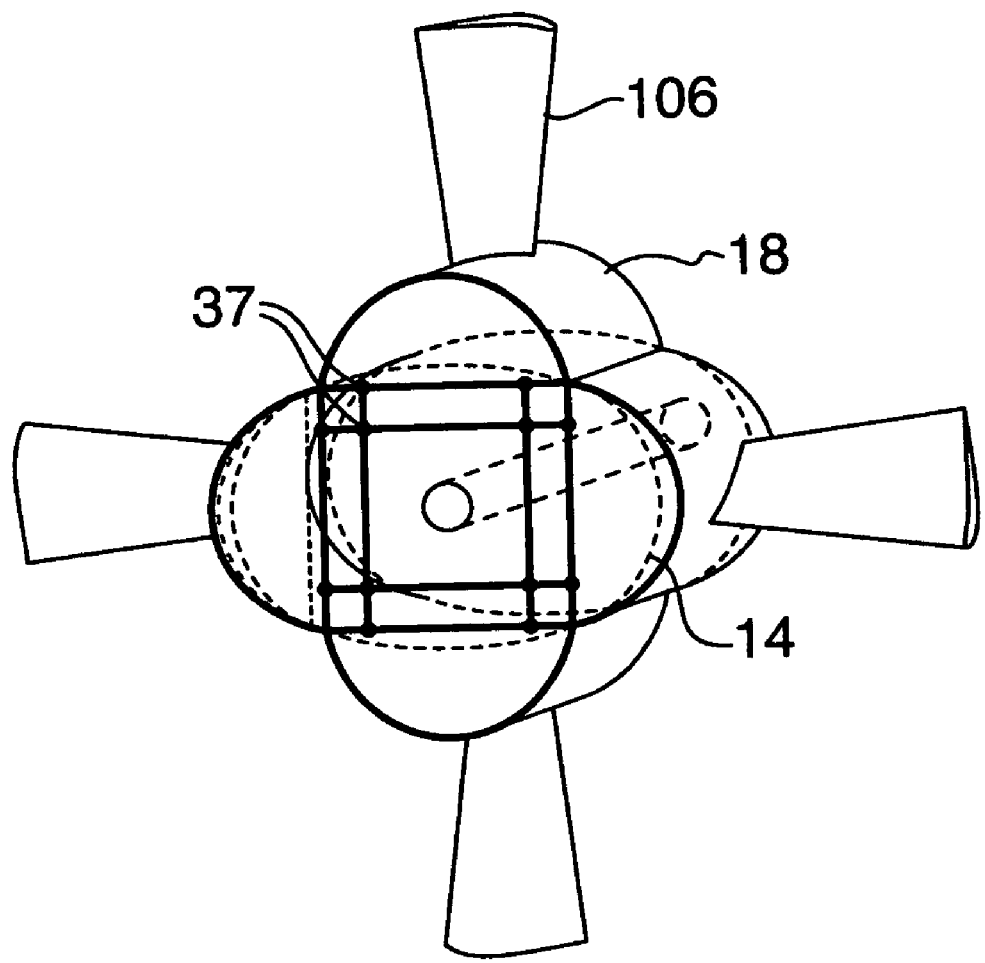
FIG. 42 illustrates an engine configuration with pistons coupled directly with fins and surrounding a non-circular stator.

Turning to possible alternatives for the instant technology, the engine may be incorporated by watercraft devices with the respective parts being composed of suitable polymeric materials, composites, etc. with the entire engine capable of being submerged in the water for effective cooling. This embodiment is generally illustrated in FIG. 42. In the embodiment, each piston can have a blade 106 schematically shown in FIG. 42, or other suitable water displacing structure directly attached to the piston. The configuration of pistons can include cover permitting desirable shape for controlling fluid dynamics.

Figure 43:
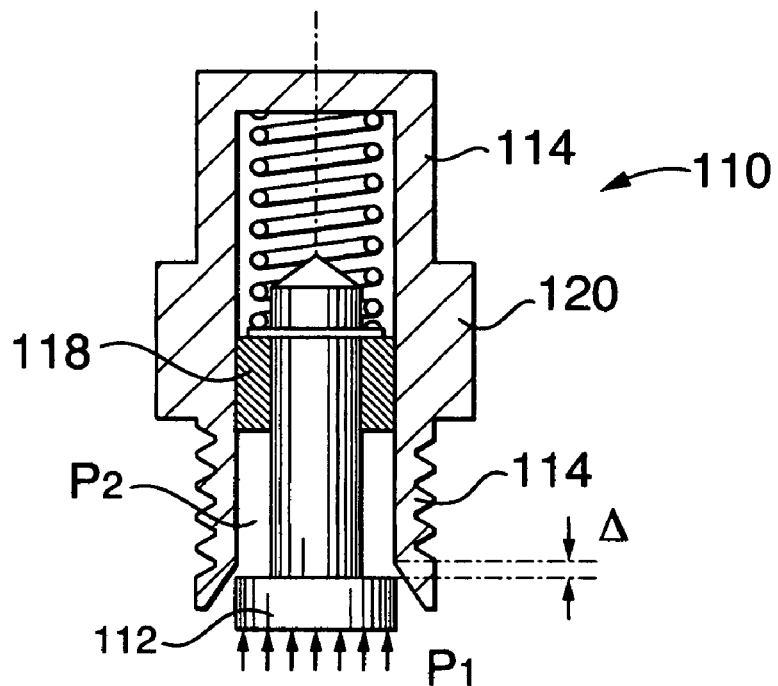
FIG. 43 illustrates an amplified compression type ignition plug.
Figure 44:
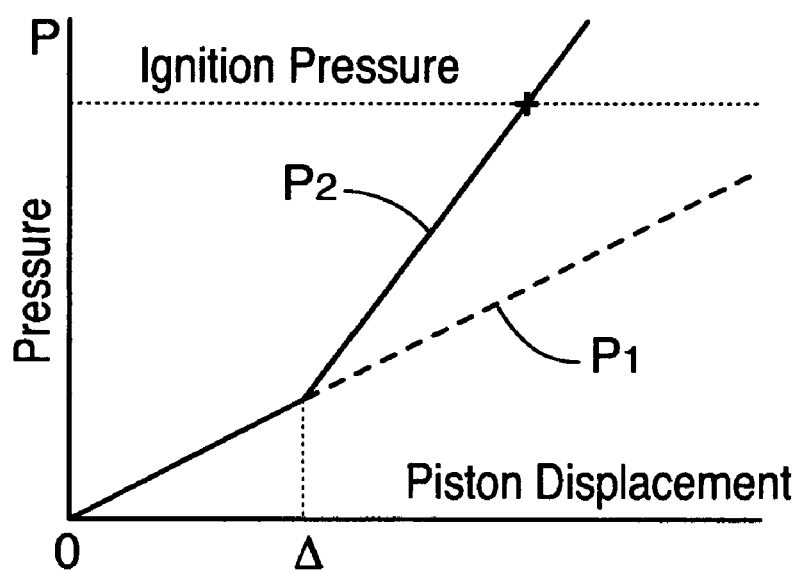
FIG. 44 illustrates a graphical representation of the method of amplification of pressure inside the ignition chamber of the plug of FIG. 43.

In respect of four stroke combustion engines, the four chambers may be used in a closed circuit with the cycles defined as follows: intake, compression, expansion and exhaust (FIGS. 3 through 8). The intake ports may utilize conventional carburetor technology or can be fitted with a gas or diesel fuel injector (not shown). Alternatively, the fuel may be injected directly into the chamber. It is also envisioned that continuous combustion can be achieved by utilizing a flame pilot technique or providing a channel between the chambers. As a further alternative to a conventional spark plug 26a (FIGS. 3 through 8), or a pair of such plugs custom to Wankel-type engines, a compression diesel igniter such as that shown in FIG. 43 and represented by numeral 110, may be used where the pressure of an air/fuel mixture is mechanically multiplied by a differential piston 112, 114 with the pressure and displacement being illustrated in FIG. 44. Upon reaching a certain displacement, a spring 116 of igniter 110 sliding within a liner 118 confines the chamber 1 to $P_2$.

The ignition timing may be achieved using electronic ignition or controlling the injection of fuel directly into the combustion chamber. The conventional spark plug cavity can be exposed to the inner volume of the chamber by means of porting the bi-rotation of the pistons.

The engine as set forth herein advantageously does not require a flywheel as the inertial capability of the piston assembly is sufficient to provide smooth rotation even on low RPMs. The projected maximum RPM of the engine is between about 3000 and 5000 RPM due to the quadruple firings per revolution which, in many instances, requires a significantly less complicated gear box or no gear box whatsoever.

In terms of cooling, the engine may be cooled by air, water or oil or in any traditional fashion for rotary engines. Where an oil pan is employed, the intensive circulation with the oil together with an external heat exchanger and filter, as discussed herein previously, may be used. More over, as a single rotor engine can be easily scaled up for achieving of quite a sufficient power rating, a direct air cooling system can preferably be employed allowing cooling of the engine housing uniformly from all sides. In addition, the asymmetrical pattern of heating predetermined by fixed position of combustion chamber can be easily smoothen by integration of an oil cooling exchanger into a coldest part of the stator itself, therefore reducing thermal stresses to the engine parts.

The engine in accordance with the present invention may be used as an expansion type machine compatible with numerous types of fluids such as steam, compressed or liquefied gasses, hydrogen, etc.

Figure 45:
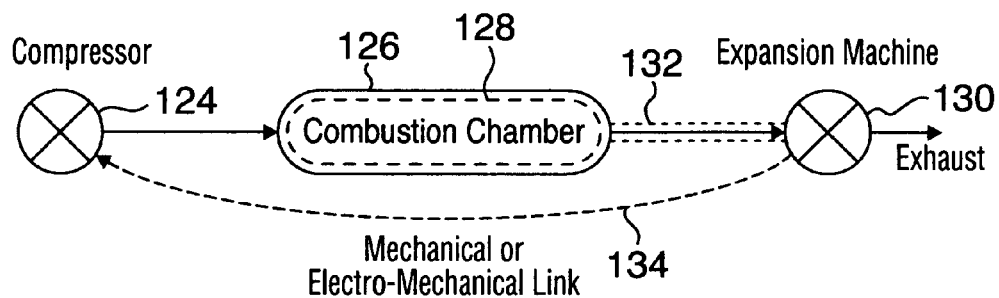
FIGS. 45 and 46 illustrate the principle of an external combustion engine according to the present invention.
Figure 46:
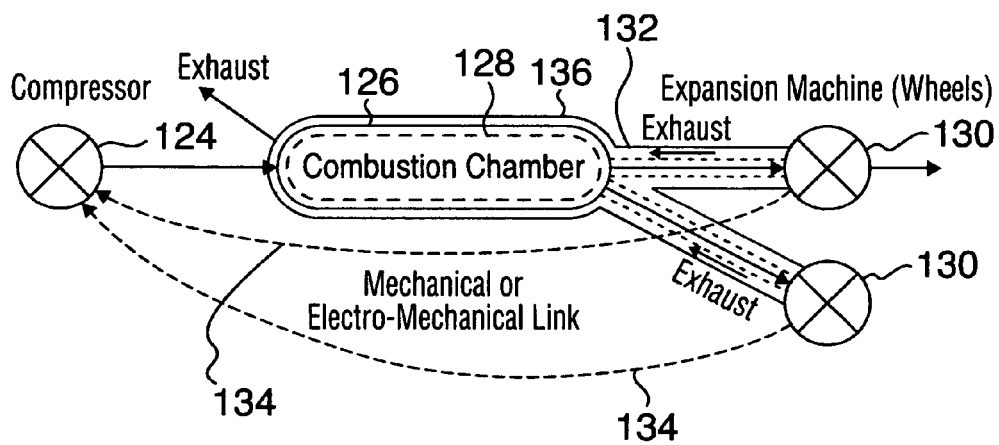
Figure 1:
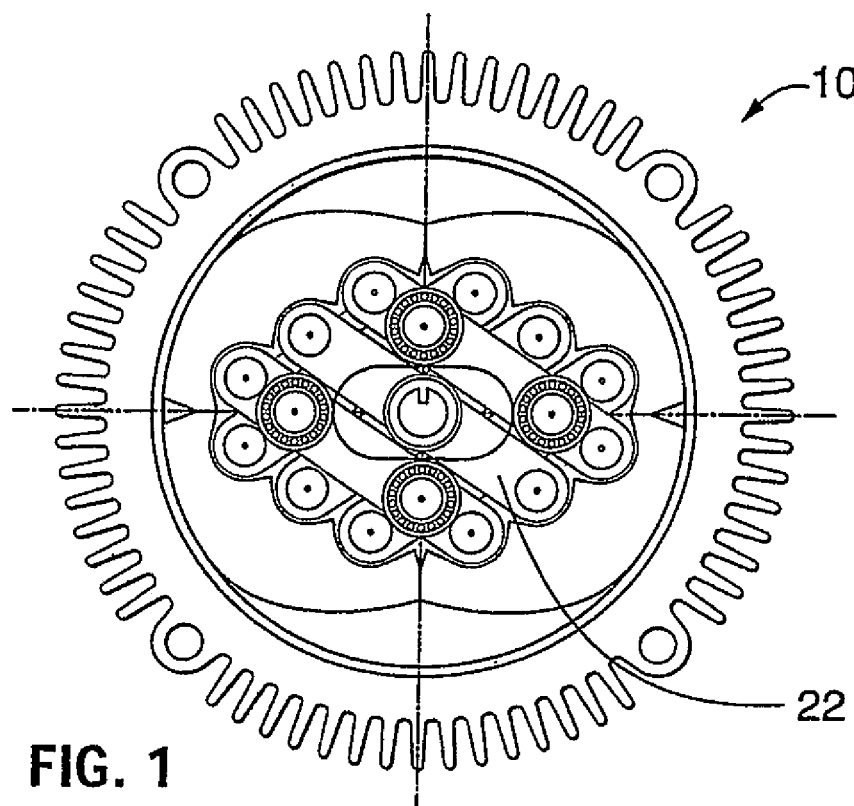
Figure 2:
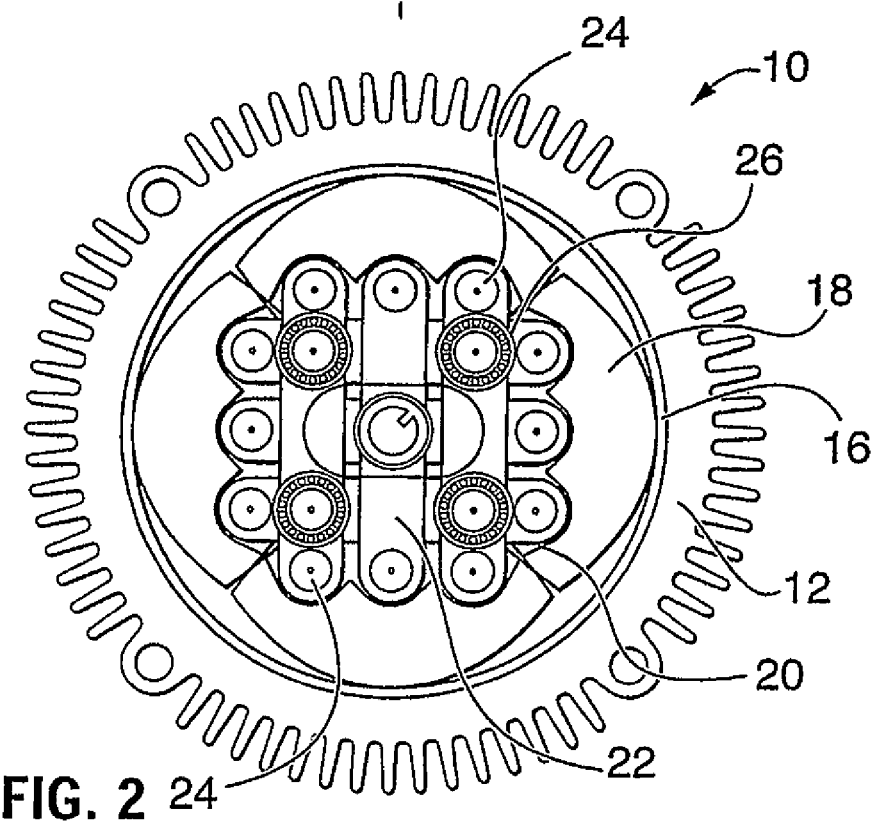
Figure 20:
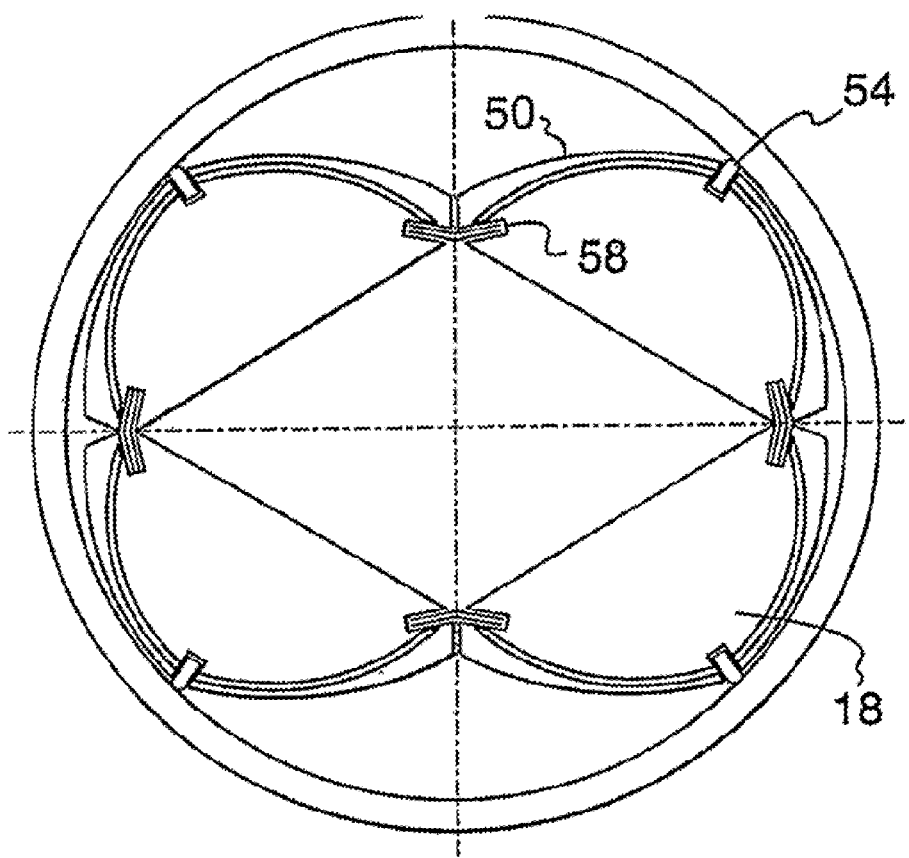
Figure 21:
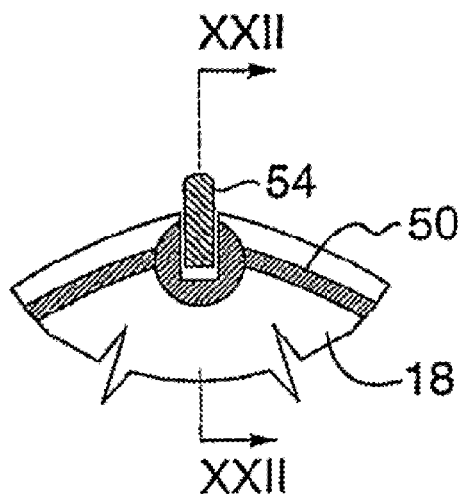
Figure 22:
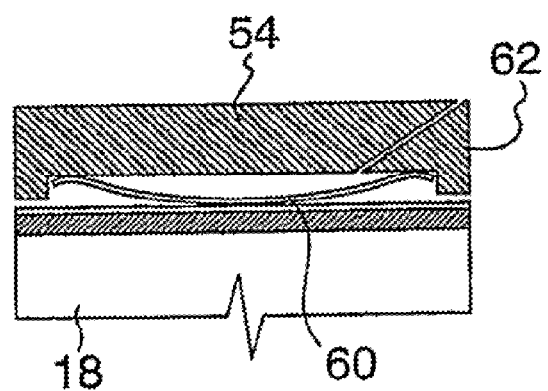
Figure 1:
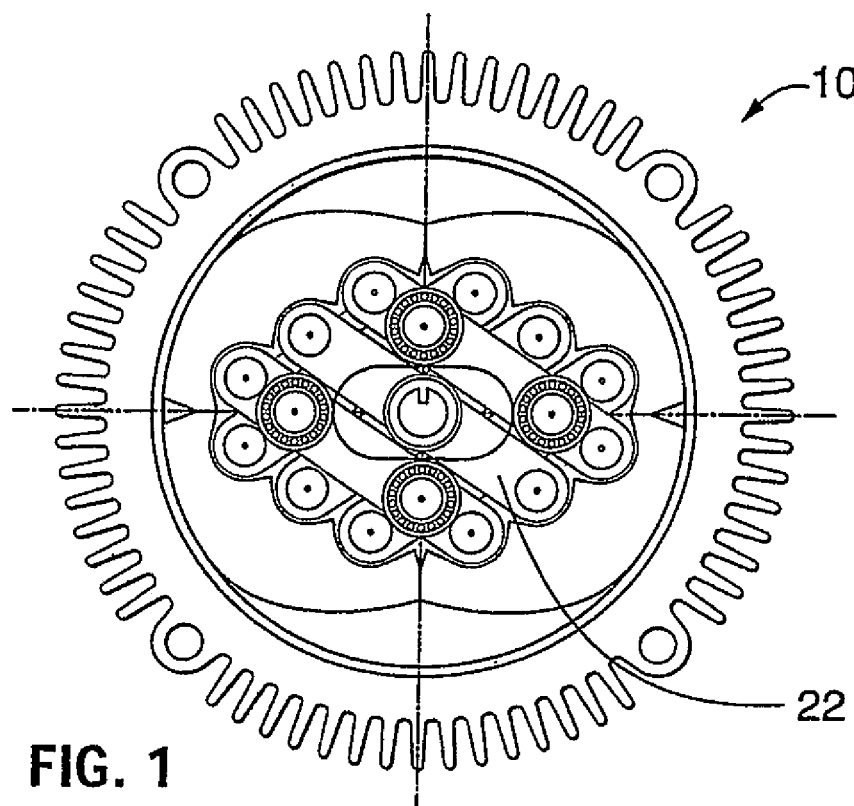
Figure 2:
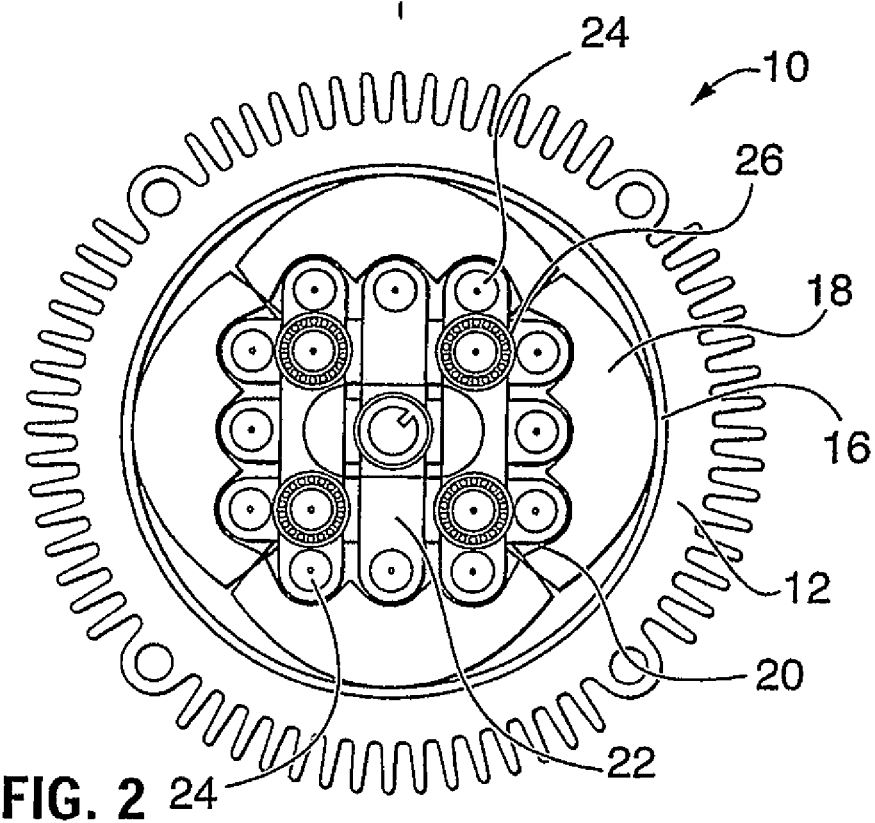
Figure 20:
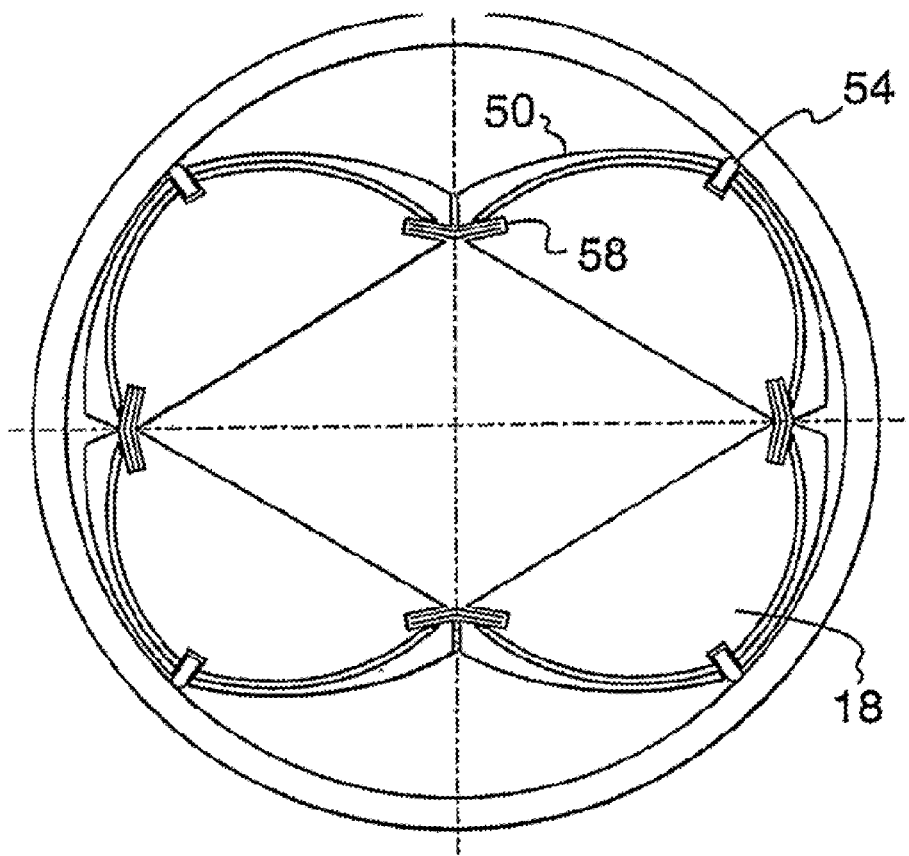
Figure 21:
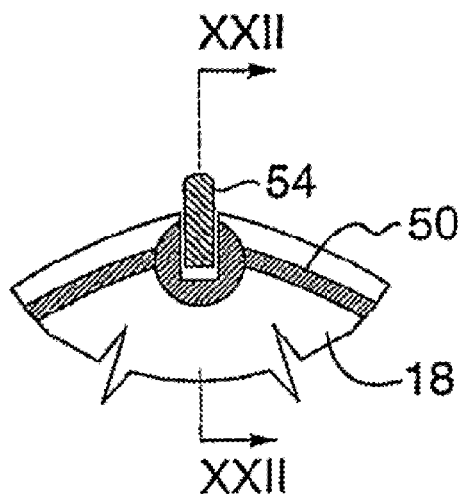
Figure 22:
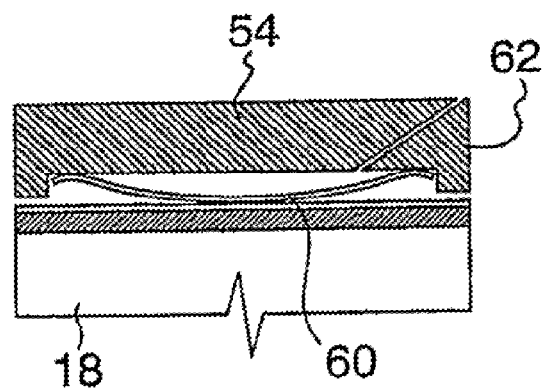

As a further alternative, as illustrated in FIGS. 45 and 46, two cycling machines may be arranged in a way that one machine 124 compresses an oxidizer such as air, and delivers it along with fuel into a high pressure combustion chamber 126 having a thermal insulation liner 128, where the energy of the products of continuous and easily optimized combustion will be fed into the expansion machine 130 through a thermally-insulated passage 132. Part of the energy created may be returned to the compressor 124 by a mechanical or electromechanical link 134.

FIG. 45 or 46 further illustrate a similar configuration of the external engine employing a hybrid system where the compressor 124 is driven by an electric motor or where the expansion machine is assisted by electric motor (not shown) as well as a machine where the exhaust will be fed back to the outer part of the combustion chamber 128 with an additional shell 136.

The arrangements as set forth herein greatly overcome the limitations of the prior art and in particular provide for arrangements where thermal energy is conserved, in a view of a sophisticated sealing arrangement, and where the operating efficiency is significantly enhanced over which was previously proposed and further, an arrangement which is capable of burning a variety of different fuels and producing a variety of different compression ratios by simple replaceable piston assemblies and deformation assemblies associated with the pistons.

Although embodiments of the invention have been described above, it is limited thereto and it will be apparent to those skilled in the art that numerous modifications form part of the present invention insofar as they do not depart from the spirit, nature and scope of the claimed and described invention.

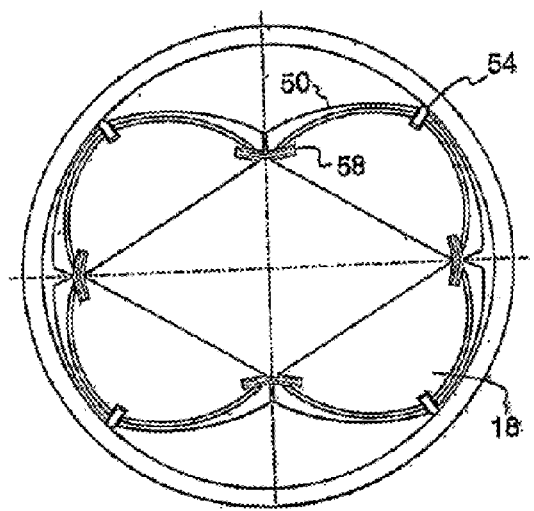

I claim:

1. A rotary cycling machine for producing mechanical energy from pressurized fluid as well as to pump, vacuum and compress fluids, comprising:
    a hollow housing having an internal contour wall and having side covers parallel to each other and perpendicular to a central axis of the housing;
    ports in communication with said interior of said housing for intake, exhaust, lubrication or cooling;
    a piston assembly having pistons in spaced relation and mounted for rotational movement within said housing;
    deformation means independent of said contour wall for deforming said piston assembly;
    linkage means connected to opposed pistons for permitting relative movement of oppositely linked pistons, said linkage means being connected to said deformation means; and
    sealing means between pistons of said piston assembly for providing a continuous seal between all pistons of said assembly during rotation.

2. The machine as set forth in claim 1, wherein said hollow housing is a substantially cylindrical housing.

3. The machine as set forth in claim 1, wherein said hollow housing is a cylindrical housing.

4. The machine as set forth in claim 1, wherein said contour wall includes a flexible liner.

5. The machine as set forth in claim 1, wherein said piston members include an auxiliary seal.

6. The machine as set forth in claim 1, wherein said deformation means is removably and entirely mounted within said interior volume of said piston assembly.

7. The machine as set forth in claim 1, wherein said machine is four stroke.

8. The machine as set forth in claim 1, wherein said machine is two stroke.

9. The machine as set forth in claim 1, wherein said machine is a pulse jet engine with at least one exhaust port associated with jet nozzle.

10. The machine as set forth in claim 1, wherein said piston assembly comprises a quartet of individual piston members.

11. The machine as set forth in claim 10, wherein said individual piston members are sealed relative to one another and said interior contour wall.

12. The machine as set forth in claim 1, wherein said piston members include an oil reservoir for retaining and dispersing oil.

13. The machine as set forth in claim 12, wherein said oil reservoir has an individual oil pump immersed in.

14. The machine as set forth in claim 1, wherein said piston assembly comprises at least two individual piston members.

15. The machine as set forth in claim 14, wherein said individual piston members are sealed relative to one another and said interior contour wall.

16. The machine as set forth in claim 14, wherein opposed pairings of said individual piston members are directly linked by said linkage means for parallel movement.

17. The machine set forth in claim 14, wherein said individual piston members have a continuous substantially arc shaped profile with an apex for following said contour wall.

18. The machine as set forth in claim 17, wherein each said apex of said piston members includes a seal.

19. The machine as set forth in claim 1, further including a centrifugally operated oil system.

20. The machine as set forth in claim 19, wherein said oil system further includes means for cooling said oil.

21. The machine as set forth in claim 19, wherein said oil system further includes means for cleaning said oil.

22. The machine as set forth in claim 19, wherein centrifugally operated oil system includes passageways within said central shaft in fluid communication with said pistons.

23. The machine as set forth in claim 22, wherein said passageways include a valve responsive to the displacement produced by a relative movement of said piston assembly to facilitate opening and closure of said valve for circulation of oil through said pistons and said central shaft.

24. The machine as set forth in claim 1, wherein said linkage means comprises a plurality of linkage arms having spaced apart ends.

25. The machine as set forth in claim 24, wherein said linkage arms of opposed pairings of pistons intersect.

26. The machine as set forth in claim 24, wherein each end of said spaced apart ends is pivotally connected to a piston member of a pair of opposed pairings.

27. The machine as set forth in claim 26, wherein said linkage arms of opposed pairings of pistons intersect in at least four points.

28. The machine as set forth in claim 26, wherein said linkage arms of opposed pairings of pistons intersect at eight points.

29. The machine as set forth in claim 1, wherein said deformation means includes a cam and a plurality of rollers for orbiting said cam.

30. The machine as set forth in claim 29, wherein said cam has at least one maximum and one minimum curvature.

31. The machine as set forth in claim 29, wherein said cam is asymmetrical in shape.

32. The machine as set forth in claim 29, wherein said cam is ovular.

33. The machine as set forth in claim 29, wherein said deformation means includes a plurality of cams.

34. The machine as set forth in claim 29, wherein said rollers facilitate movement of said linkage means.

35. The machine as set forth in claim 1, wherein said sealing means is a continuous seal with respect to said internal contour wall.

36. The machine as set forth in claim 35, wherein said continuous sealing means includes a discrete sealing element between adjacent individual piston members.

37. The machine as set forth in claim 36, wherein each discrete sealing element comprises a tubular member configured for sealing engagement with adjacent piston members.

38. The machine as set forth in claim 37, wherein said tubular member is segmented into a plurality of individual sections moveable relative to one another.

39. The machine as set forth in claim 37, wherein said tubular member is segmented into at least two mating segments defined by a helical interface.

40. The machine as set forth in claim 37, wherein said tubular member includes a sealing insert coaxially disposed within said tubular member.

41. The machine as set forth in claim 40, wherein said sealing insert is continuous and includes a coaxially disposed spring means having terminal ends connected to said tubular member.

42. The machine as set forth as in claim 40, wherein said sealing insert is at least partially flexible for torsional and axial deformation of sections of said tubular member.

* * * * *

UNITED STATES PATENT AND TRADEMARK OFFICE
CERTIFICATE OF CORRECTION

PATENT NO. : 7,178,502 B2
APPLICATION NO. : 10/834984
DATED : February 20, 2007
INVENTOR(S) : Paul D. Okulov It is certified that error appears in the above-identified patent and that said Letters Patent is hereby corrected as shown below:

In The Drawings
Figures 1, 2 and 20 have been reproduced to correct the oval appearance of the circular stator as shown on the attached sheets 1 and 7 of 17.

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

PATENT NO.      : 7,178,502 B2
APPLICATION NO. : 10/834984
DATED           : February 20, 2007
INVENTOR(S)     : Paul D. Okulov It is certified that error appears in the above-identified patent and that said Letters Patent is hereby corrected as shown below:

Delete the title page and substitute therefor the attached title page.

<u>In The Drawings</u>
Figures 1, 2 and 20 have been reproduced to correct the oval appearance of the circular stator as shown on the attached sheets 1 and 7 of 17.

This certificate supersedes Certificate of Correction issued October 30, 2007.

Signed and Sealed this

Twentieth Day of November, 2007

JON W. DUDAS
*Director of the United States Patent and Trademark Office*

(12) United States Patent
Okulov

(10) Patent No.: US 7,178,502 B2
(45) Date of Patent: Feb. 20, 2007

(54) BALANCED ROTARY INTERNAL COMBUSTION ENGINE OR CYCLING VOLUME MACHINE

(75) Inventor: Paul D. Okulov, 12 Senneville Road, St-Anne-de-Bellvue, QC (CA) H9X 1B1

(73) Assignee: Paul D. Okulov, St-Anne-de-Bellevue (CA)

(*) Notice: Subject to any disclaimer, the term of this patent is extended or adjusted under 35 U.S.C. 154(b) by 130 days.

(21) Appl. No.: 10/834,984

(22) Filed: Apr. 30, 2004

(65) Prior Publication Data
US 2005/0000483 A1 Jan. 6, 2005

Related U.S. Application Data

(63) Continuation of application No. 10/160,072, filed on Jun. 4, 2002, now abandoned.

(60) Provisional application No. 60/295,577, filed on Jun. 5, 2001.

(51) Int. Cl.
- F02B 53/00 (2006.01)
- F01C 19/02 (2006.01)
- F01C 1/40 (2006.01)
- F01C 21/00 (2006.01)
- F01C 1/00 (2006.01)
- F01C 19/00 (2006.01)
- F01C 1/10 (2006.01)
- F01C 1/22 (2006.01)
- F01C 1/34 (2006.01)
- F01C 21/08 (2006.01)
- F01C 21/10 (2006.01)
- F04C 27/00 (2006.01)
- F02B 75/00 (2006.01)
- F02B 75/36 (2006.01)

(52) U.S. Cl. ............ 123/241; 60/525; 123/245; 277/357; 418/35; 418/36; 418/61.1

(58) Field of Classification Search ............ 60/39.05, 60/525, 58, 673; 74/63; 123/8, 18 A, 38, 123/65 R, 193.6, 197.5, 222, 229, 234, 240, 123/241, 243, 245, 472; 277/357; 310/42; 418/35, 36, 61.1, 253
See application file for complete search history.

(56) References Cited

U.S. PATENT DOCUMENTS

| | | |
|---|---|---|
| 716,978 A | 12/1902 | Werner |
| 3,228,183 A | 1/1966 | Feller |
| 3,295,505 A | 1/1967 | Jordan |
| 3,387,596 A | 6/1968 | Neimand |
| 3,442,257 A | 5/1969 | Walker |
| 3,614,277 A | 10/1971 | Kobayashi |
| 3,690,791 A | 9/1972 | Dieter |
| 3,918,415 A | 11/1975 | Ishida |
| 3,933,131 A | 1/1976 | Smith |
| 3,950,117 A | 4/1976 | Artajo |
| 3,996,899 A | 12/1976 | Partner et al. |
| 4,042,312 A | 8/1977 | Betts |
| 4,068,985 A | 1/1978 | Baer |
| 4,144,866 A | 3/1979 | Hakner |
| 4,296,936 A | 10/1981 | Wenkel |
| 4,308,002 A | 12/1981 | Di Stefano |
| 4,434,757 A | 3/1984 | Walker |
| 4,546,171 A | 10/1985 | Larson |
| 5,036,809 A | 8/1991 | Goodman |
| 5,203,295 A | 4/1993 | Alexander |
| 5,288,217 A | 2/1994 | Contiero |
| 5,305,716 A | 4/1994 | Huttlin |
| 5,305,721 A | 4/1994 | Burtis |
| 5,399,078 A | 3/1995 | Kuramasu |
| 5,494,859 A | 4/1995 | Le Bell, Jr. |
| 6,089,847 A | 1/2000 | Huttlin |
| 6,164,263 A | 12/2000 | Saint Hilaire et al. |
| 6,431,139 B1 | 8/2002 | Huttlin |
| 6,718,938 B2 * | 4/2004 | Szorenyi ............... 123/241 |
| 2003/0062020 A1 * | 4/2003 | Okulov ............... 123/241 |

FOREIGN PATENT DOCUMENTS

| | | |
|---|---|---|
| DE | 1451830 | 4/1969 |
| DE | 1295569 | 5/1969 |
| DE | 2226674 | 12/1973 |